July 28, 1970     A. OSDOR     3,522,152
DESALINATION OF SALINE WATER BY PHASE SEPARATION NEAR
CRITICAL PRESSURE OF PURE WATER
Filed April 20, 1964     8 Sheets-Sheet 1

INVENTOR

ASRIEL OSDOR

BY

ATTORNEY

July 28, 1970 A. OSDOR 3,522,152
DESALINATION OF SALINE WATER BY PHASE SEPARATION NEAR
CRITICAL PRESSURE OF PURE WATER
Filed April 20, 1964 8 Sheets-Sheet 5

INVENTOR.
ASRIEL OSDOR
BY
ATTORNEY

INVENTOR.
ASRIEL OSDOR

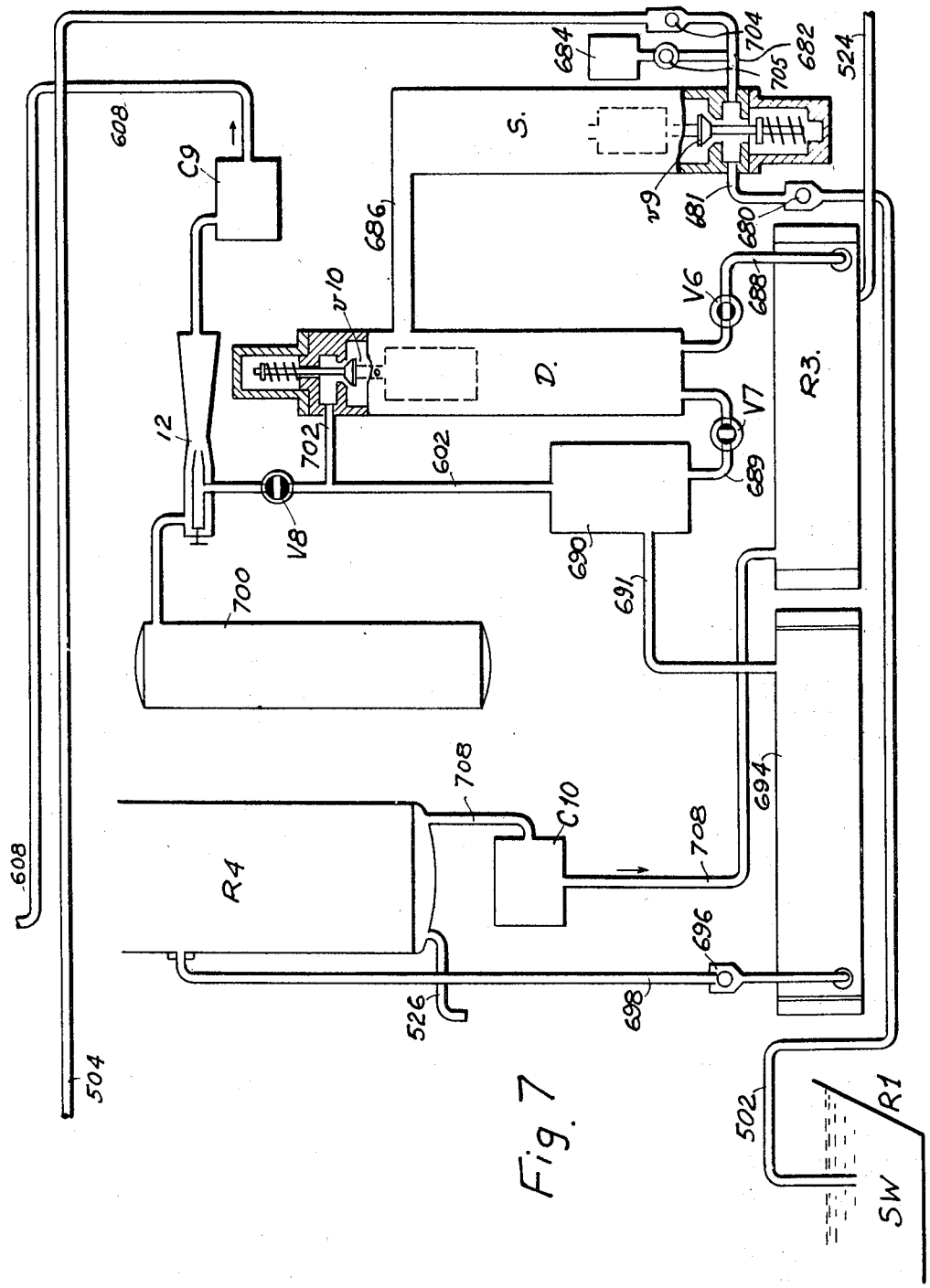

United States Patent Office 3,522,152
Patented July 28, 1970

3,522,152
DESALINATION OF SALINE WATER BY PHASE SEPARATION NEAR CRITICAL PRESSURE OF PURE WATER
Asriel Osdor, Tel Aviv, Israel, assignor, by mesne assignments, to Hydro Chemical & Mineral Corp., New York, N.Y., a corporation of Delaware
Continuation-in-part of application Ser. No. 89,099, Feb. 10, 1961. This application Apr. 20, 1964, Ser. No. 360,813
Claims priority, application Israel, Feb. 29, 1960, 13,557; Feb. 10, 1964, 20,773
Int. Cl. B01d 3/10; C02b 1/06
U.S. Cl. 203—11
8 Claims

ABSTRACT OF THE DISCLOSURE

A process and apparatus are described for the desalination of saline water by effecting the phase separation in the vicinity of the critical pressure of pure water, additionally compressing the pure water vapor, and utilizing the water vapor to heat raw saline water by countercurrent heat exchange. Intermediary fluids are used as heat-exchange media between the cold saline water and the hot pure water and vapor. One intermediary fluid is a gas (e.g. nitrogen) which is compressed while at a lower temperature and is expanded while at a higher temperature to generate an excess of work which is available for use in mechanically driving the fluids or for other purposes. Hydraulic pressure-exchanging devices are provided for driving, pumping or exchanging pressures between different fluids in the process.

---

The present invention relates to a process and apparatus for separating solvents and/or solutes from liquid solutions, and to hydraulic pressure-exchanging devices useful therein. The invention can be advantageously used for producing pure or reduced-concentration solvents and/or pure or high-concentration solutes, as desired. It is particularly suitable for the demineralization or desalination of saline water, especially sea water, and is therefore hereinafter described with respect to this application.

The present patent application is a continuation-in-part of my pending U.S. patent application Ser. No. 89,099 filed Feb. 10, 1961, now abandoned.

(A) INTRODUCTION

Many systems have been heretofore proposed for desalinating saline water. However, the cost for desalinated water still remains very high because the known systems are generally characterized by relatively large initial equipment costs, large energy costs, and/or large amortization and maintenance costs, for one or more of the following reasons: (1) requirement for a large amount of energy because of the latent heat of vaporization or freezing of water; (2) formation of corrosion and scale; (3) requirement for large size mechanical driving means for pumping, compressing, etc. the various materials involved.

An object of the present invention is to provide a new method and apparatus for the separation of a solvent and/or solute from a liquid solution, and more particularly for the desalination of saline water, which method and apparatus have improved characteristics in one or more of the above respects.

A further object of the invention is to provide a method and apparatus for separating a solvent and/or solute from a liquid solution in which there is produced, as a by-product, an excess of energy available for mechanical work, such as pumping or compressing the various fluids in the system, thereby substantially reducing or eliminating the need for relatively large and expensive mechanical equipment.

A further object of the invention is to provide novel hydraulic devices which translate or exchange the pressure of one fluid in the system to that of another fluid (which may be the same fluid under different conditions) in the system, the use of such devices further reducing the need for relatively large, expensive and corrosive-prone pumping, compressing and other mechanical equipment.

A number of additional objects and advantages of the invention will become apparent as the description proceeds, and are summarized at the end.

Figure 2A:
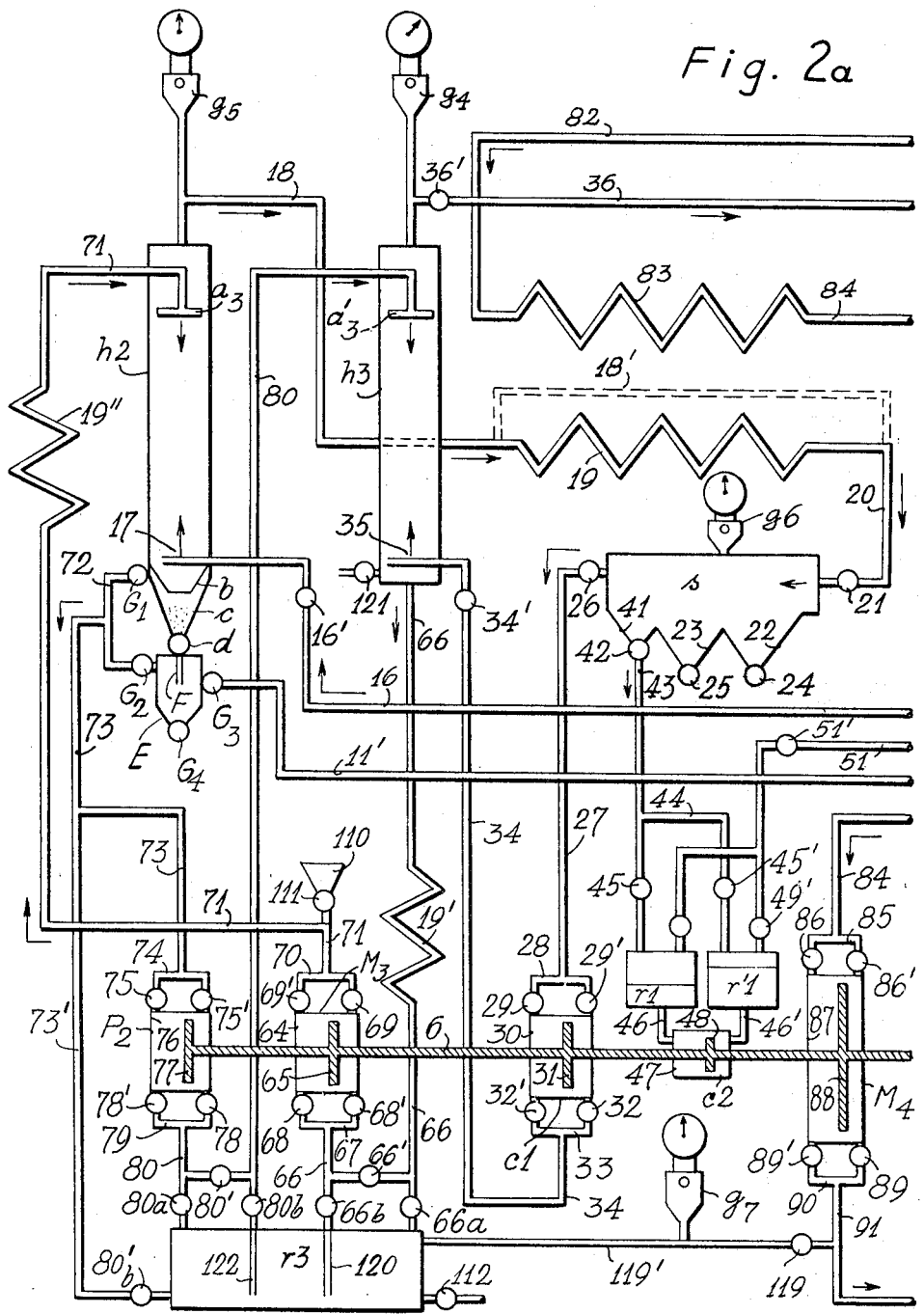
Figure 2B:
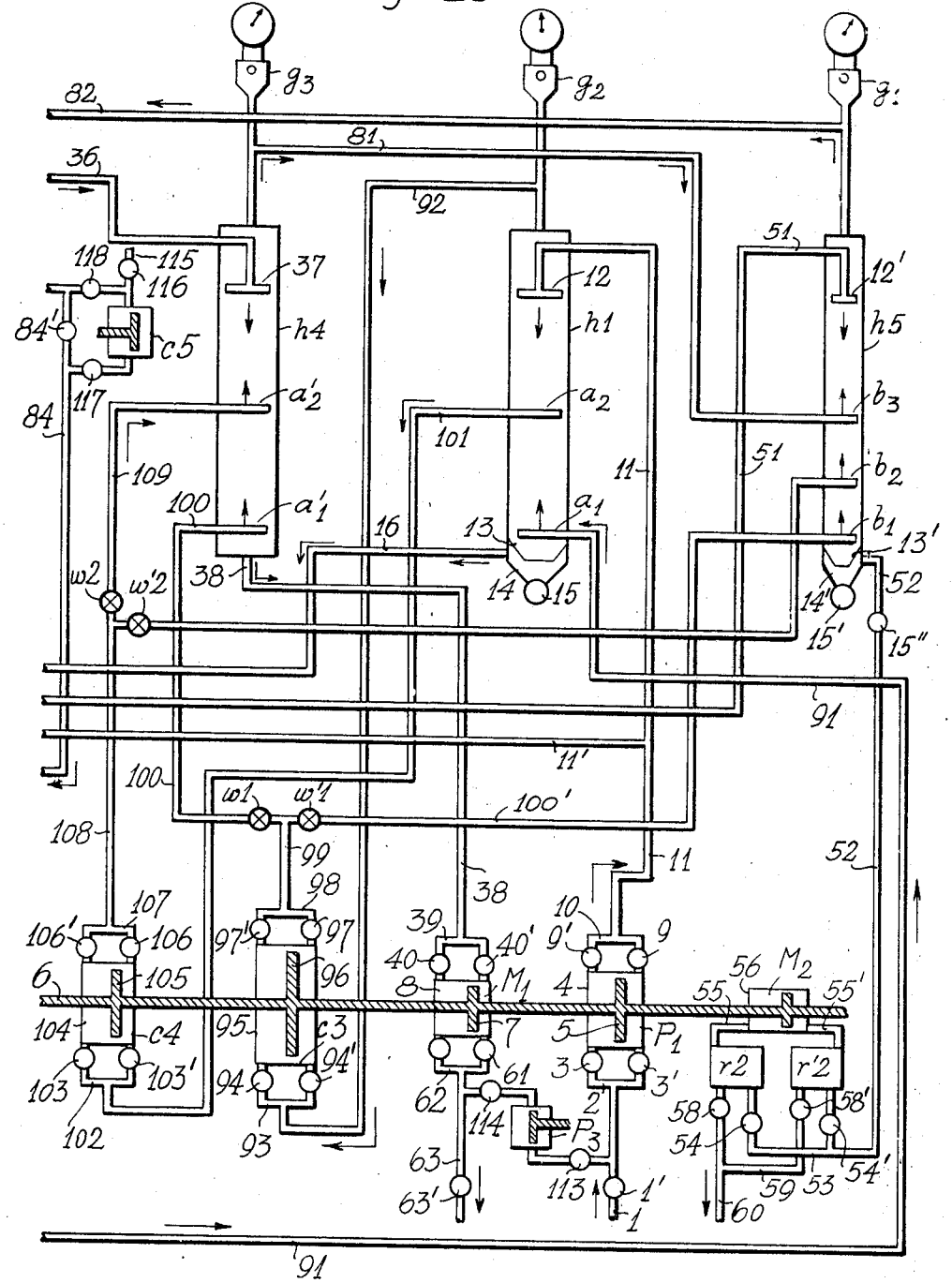
Figure 3:
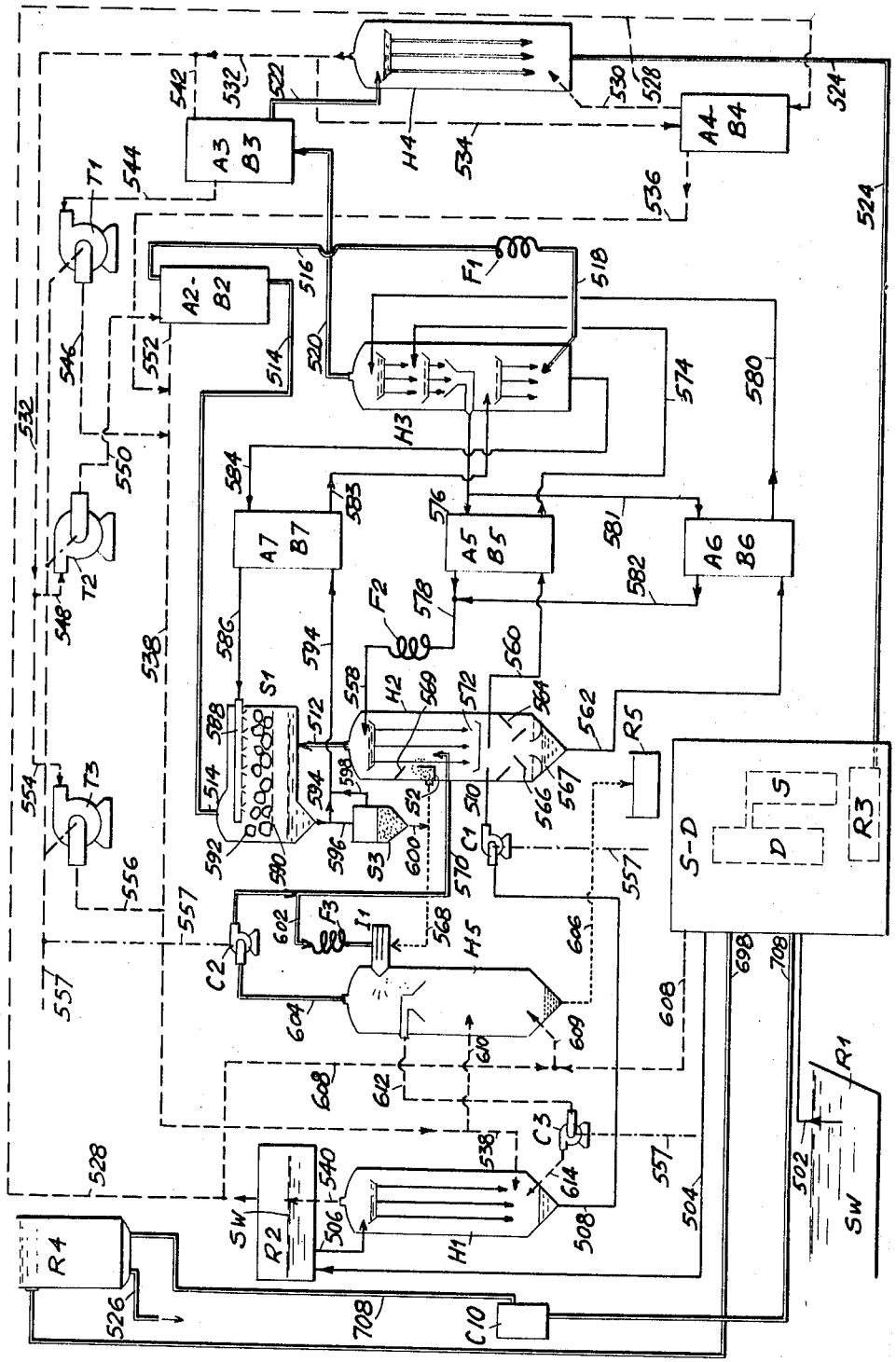
Figure 4:
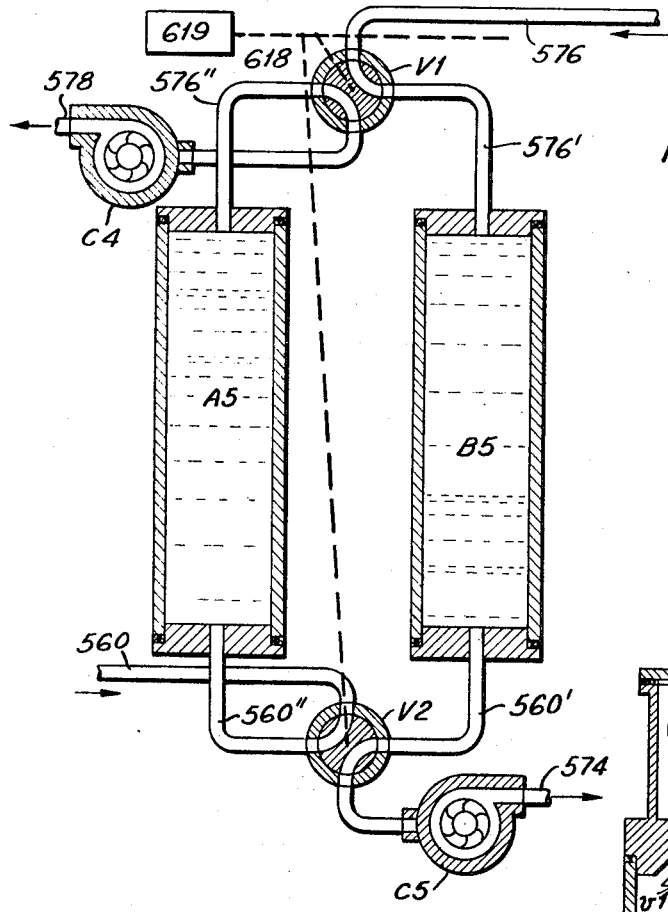
Figure 5:
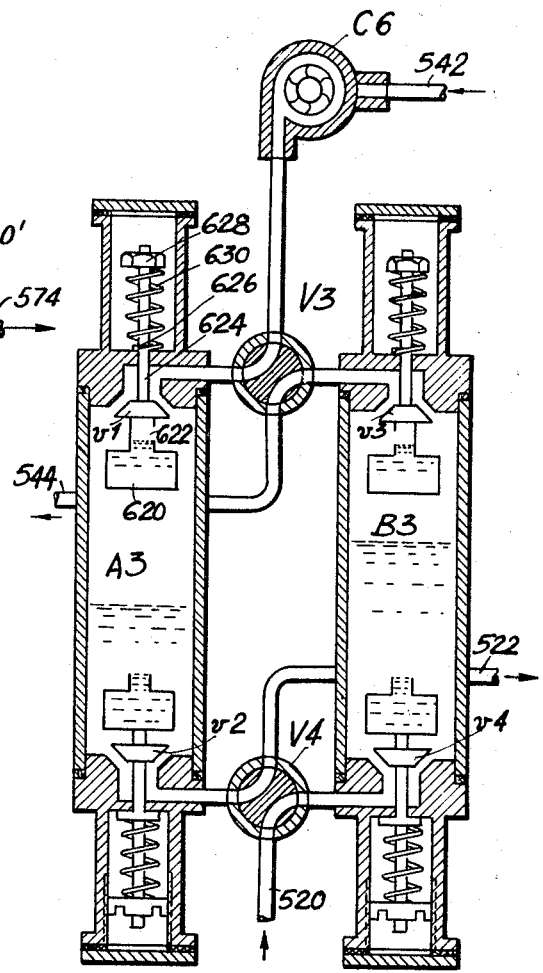
Figure 6:
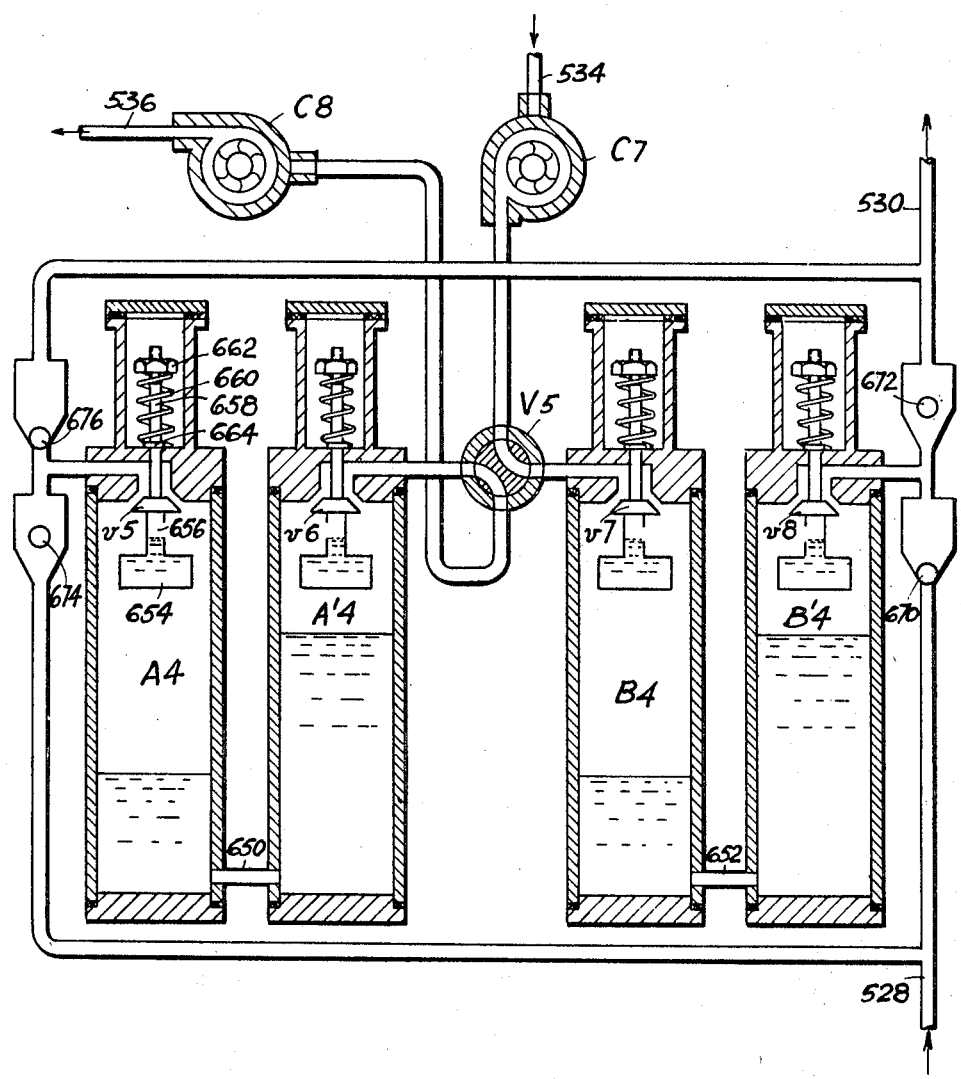

FIGS. 2a and 2b, taken together, constitute a diagram of one design of water desalination system constructed in accordance with the invention;

FIG. 3 is a diagram of an improved design of water desalination system constructed in accordance with the invention;

FIG. 4 is a diagram of one form of hydraulic pressure-exchanging device used in the system of FIG. 3;

FIG. 5 is another form of hydraulic pressure-exchanging device used in the system of FIG. 3;

FIG. 6 is a further form of hydraulic pressure-exchanging device used in the system of FIG. 3; and FIG. 7 is a diagram of an arrangement for pumping the incoming saline water into the system of FIG. 3 and for recovering the nitrogen used in the system.

The type of water desalination system in which the invention may be particularly used is that based on phase separation in the vicinity of the critical pressure.

The thermodynamic properties of pure water at the critical point are:

TABLE 1

Temperature—374.15° C.
Pressure—225.65 kg./cm.$^2$
Specific volume—0.00326 m.$^3$/kg.
Enthalpy—501.5 kcal.
Evaporation heat—0
Entropy—1.053 kcal./° C.

Phase separation at this point is based on the advantage that the latent heat of evaporation of pure water at or above the critical pressure is zero. However, it introduces another problem, called the "squeeze" problem in the discussion of this point by Ellis in his book Fresh Water From the Oceans, 1954, pp. 143–151.

Briefly, the "squeeze" problem arises because of the following phenomenon. At the critical pressure (225.65 kg./cm.$^2$), the specific heat of water is approximately 1 kcal./kg. between 0° C. and 140° C. and increases slowly to about 1.2 kcal./kg. at 300° C., and then rapidly to a mean specific heat of about 16 kcal./° C. between 370° and 380° C. The critical temperature of water is 374.15° C. Above the critical temperature, the specific heat of water decreases with further rise of temperature. Therefore, when using the separated vapor and brine fractions at a temperature above the critical point to heat the cold saline water, they cannot provide the necessary heat for heating the saline water in the region of the critical point to raise its temperature the same number of degrees as the former are cooled. For example, cooling the vapor and brine 5° will not raise the temperature of the saline water 5°. Much more heat must be added because of the increase of the specific heat at this point. This requirement for the greater amount of heat that must be added offsets to a substantial extent the gain that would otherwise be available from the fact that critical pressure distillation of pure water does not involve latent heat of evaporation.

To overcome the "squeeze" problem, it has been suggested (see Von Platen U.S. Pat. No. 2,520,186) to work at a pressure exceeding considerably the critical pressure, e.g. at pressures of about 300–350 kg./cm.$^2$. However, this does not completely solve the "squeeze" problem. For example, at 300 kg./cm.$^2$, there is still a "squeeze" area between about 395° C. and 405° C., wherein the mean specific heat is about 6.2 kcal./° C. Moreover, there are further draw-backs to this approach when used in desalination systems, including the following:

There are at least two important advantages both of which are lost in the above-suggested process, in effecting the phase separation as near as possible to the critical pressure, or even a little below: namely, (1) it permits the use of less expensive equipment; and (2) it permits the production of desalinated water having a very low salt content. With respect to the latter, see The Phase Diagram of Sodium Chloride and Steam Above the Critical Point by Arne Olander and Halvard Liander, ACTA Chemica Scandinavia 4 (1950) 1437–1445. The following table gives the phase separation temperature at the critical pressure for different sodium chloride concentration as abstracted from this diagram. It also gives the corresponding quantities of the liquid and vapor phases per 1036 kg. of a salt solution containing 3.5% sodium chloride, and the quantity of vapor separated by the rise in temperature.

TABLE 2

| Sodium chloride concentration (percent) | Phase separation temperature (° C.) | Liquid phase (kg.) | Vapor phase (kg.) | Vapor phase separated by rise in temperature (kg.) |
| --- | --- | --- | --- | --- |
| 0 | 374.15 | 1,036 | 0 | 0 |
| 3.5 | 377.5 | 1,036 | 0 | 0 |
| 7 | 380.5 | 518 | 518 | 518 |
| 15 | 386.5 | 242 | 794 | 276 |
| 25 | 395.5 | 145.0 | 891 | 97 |
| Saturation | 428 | [1] 0 | 1,000 | 109 |

[1] 36 kg. salt.

The following table gives the chlorine content of steam separated from a sodium chloride solution at different temperatures above the critical temperature and (1) at a little below the critical pressure, (2) at the critical pressure, and (3) above the critical pressure:

TABLE 3.—CHLORINE IONS CONCENTRATION OF THE SUPERHEATED VAPOR PHASE (PERCENT)

| Temperature (° C.) | Pressure (kg./cm.$^2$) | | |
| --- | --- | --- | --- |
|  | 200 | 225 | 300 |
| 400 | 0.011 | 0.021 |  |
| 415 | 0.0073 | 0.014 | 0.18 |
| 435 | 0.0061 | 0.011 | 0.08 |
| 480 |  |  | 0.03 |

According to one feature of the invention the "squeeze" problem is largely avoided in the present process by effecting the phase separation in the vicinity of the critical pressure of the solvent; and then after phase separation, additionally compressing the solvent-rich vapor fraction to raise its specific heat before utilizing the heat of the solvent-rich vapor fraction to heat additional liquid solution to be desalinated. Because the phase separation is effected in the vicinity of the critical pressure, rather than at the considerably higher pressures previously suggested, the process may be used to produce desalinated water of very low salt content, and moreover may be practiced with less expensive equipment. At the same time, the "squeeze" problem discussed in Ellis is largely avoided, as will be explained more fully below in connection with the description of the FIG. 1 diagram.

According to another feature of the invention, intermediary fluids are used as heat-exchange media between the cold raw liquid solution (saline water) and the hot solvent-rich fraction (substantially pure water). The intermediary fluids are immiscible and chemically inert with respect to saline water and pure water and have a markedly higher or lower density than the water. Preferably, there are a plurality of heat-exchange cycles with the intermediary fluids coming into direct contact with the media being heated or cooled thereby.

In accordance with a further feature of the invention, the cold liquid solution is heated from the hot separated solvent fraction by means of at least one heat-exchange cycle which includes a gas intermediary fluid. The gas, during the heat-exchange cycle, is compressed while at a lower temperature and is expanded while at a higher temperature to generate an excess of work which is available for use in mechanically driving the fluids in the process, or for other purposes. The system thus converts thermal energy into mechanical work needed to operate the plant, so that instead of supplying the expensive mechanical power, the much less expensive fuel heat may be supplied utilizing the thermodynamic cycle of the intermediary heat-exchange gas to generate the needed mechanical power as a by-product of the process.

Figure 1A:
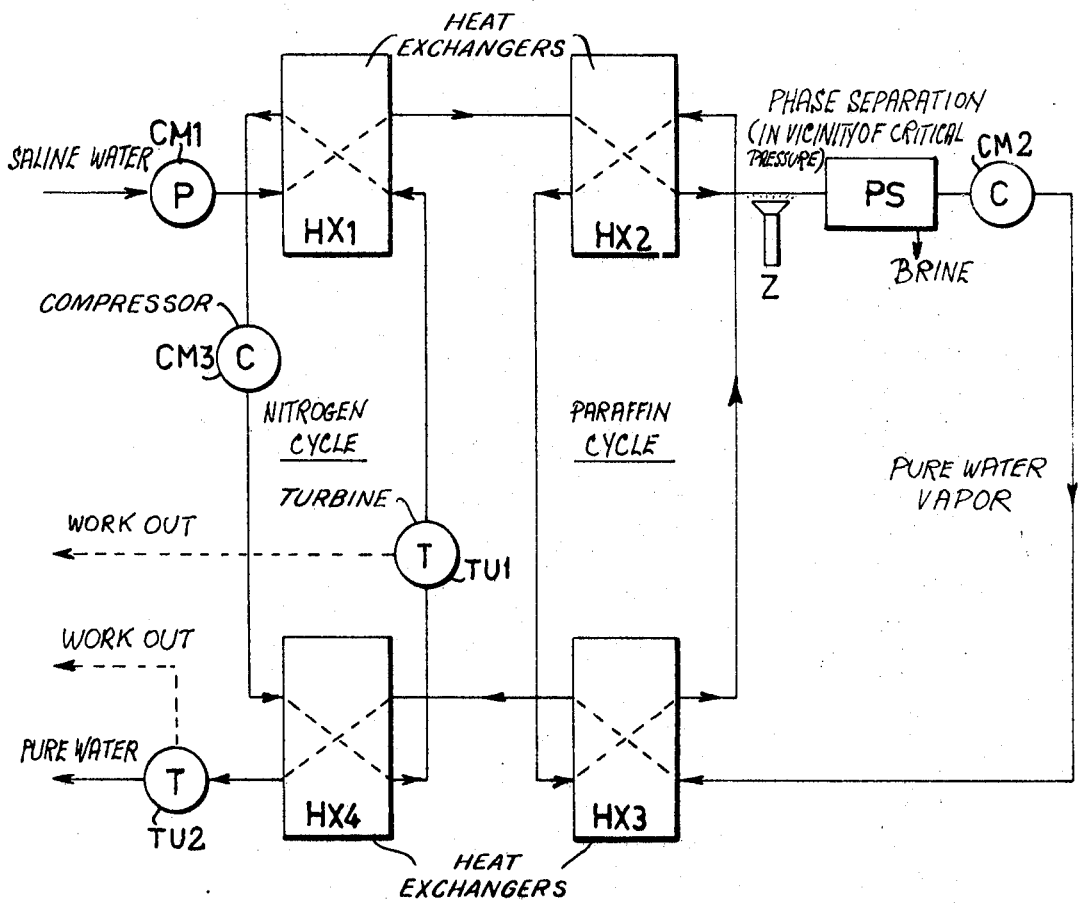
FIG. 1a is a simplified diagram illustrating several features of the invention.

The foregoing features are schematically illustrated in the simplified diagram of FIG. 1a. In this diagram there are shown two heat-exchanging cycles using intermediary fluids, namely a cycle of nitrogen involving heat-exchangers HX1 and HX4 and a paraffin (or other hydrocarbon) cycle involving heat-exchangers HX2 and HX3. As shown in FIG. 1a, the cold saline water is passed through a pump CM1 where its pressure is raised to the vicinity of the critical point of pure water, and then through heat-exchangers HX1 and HX2 where its temperature is raised by hot nitrogen and then by hot paraffin. Further heat is added by heater Z, and phase separation occurs in phase-separator PS, the brine exiting from the bottom. The pure water vapor is passed through compressor CM2 where its pressure is further raised, and the compressed water vapor is passed through heat-exchanger HX3 to heat the paraffin in the paraffin cycle. The water, now liquid, is passed through heat-exchanger HX4 to heat the nitrogen in the nitrogen cycle. The cold nitrogen exiting from heat-exchanger HX1 is passed through a compressor CM3 where its pressure is raised before introduction into heat-exchanger HX4, and the hot nitrogen exiting from the latter heat exchanger is passed through a turbine TU1 where its pressure is dropped before introduction into heat-exchanger HX1. Turbine TU1 produces work output which may be used for driving the fluids in the process, or for other purposes. The pure water exiting from heat-exchanger HX4 is under high pressure which also may be used, as schematically shown by turbine TU2, for producing work output.

According to a still further feature of the invention, hydraulic pressure-exchanging devices are provided for driving, pumping, or exchanging pressures between different fluids in the process. The use of such devices not only reduces the need for expensive mechanical motive power, pumping, compressing and fluid moving equipment, but also reduces or eliminates the need for moving parts coming into contact with the corrosive saline water.

Figure 1B:
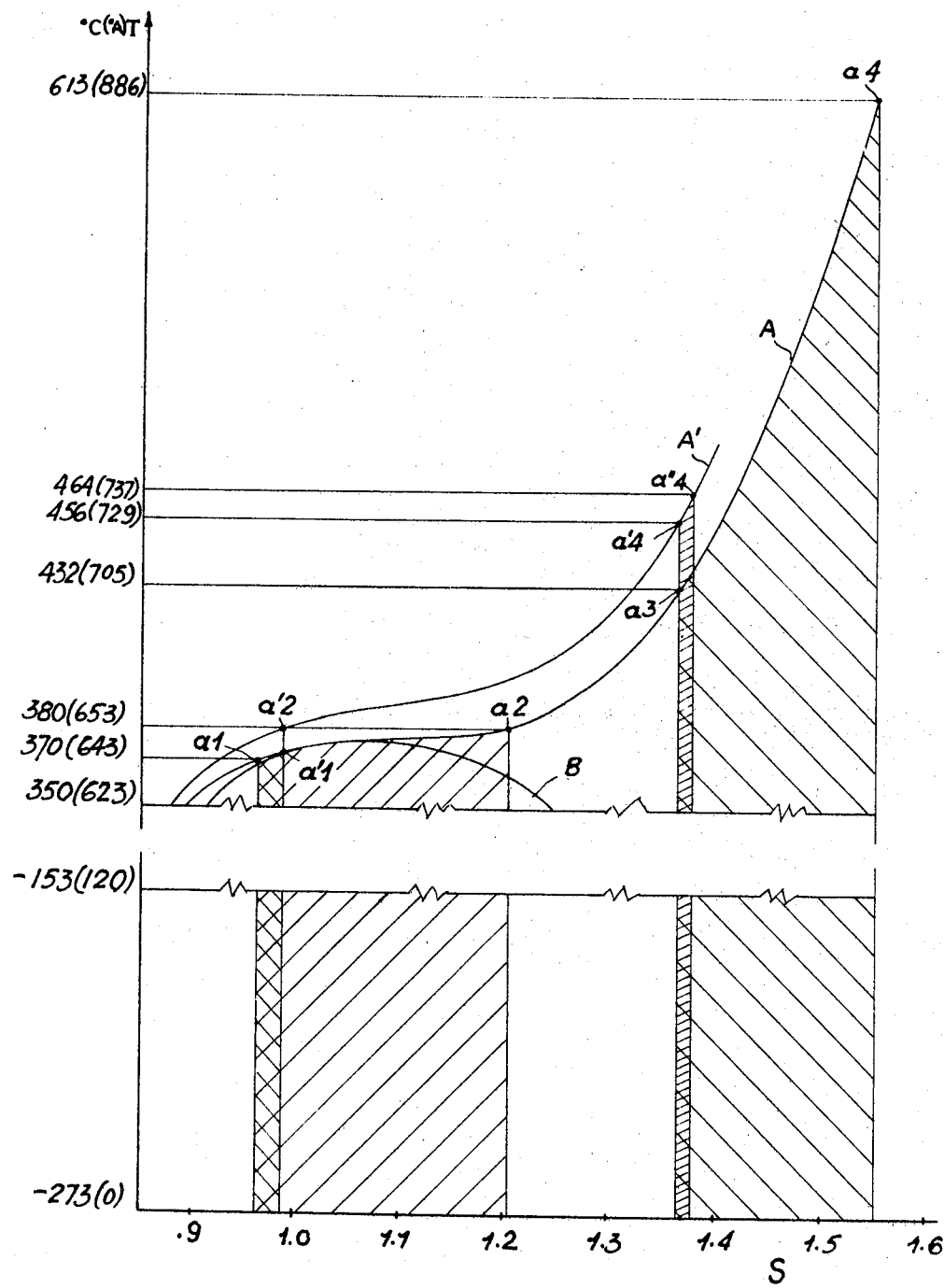
FIG. 1b is a temperature-entropy diagram for pure water which will be helpful in explaining the invention.

(B) THE TEMPERATURE-ENTROPY DIAGRAM OF FIG. 1b

As indicated earlier, the "squeeze" problem is largely avoided according to a feature of the present invention involving the step of additionally compressing the solvent-rich vapor fraction after phase-separation in the vicinity of the critical pressure and before it is used to heat additional liquid solution to be demineralized. The results of the additional compression of the vapor phase are:

(1) A rise in the temperature of the vapor. For example, compressing adiabatically super-heated steam at 400° C. from 225 to 260 kg./cm.$^2$ raises the temperature to about 421° C.

(2) An increase in the specific heat of the additionally compressed vapor. Consequently, in contrast to the very large temperature differentials (which means a very large amount of heat that had to be supplied at the top of the ladder to maintain a sufficient temperature differential in the vicinity of the critical point) required in previously proposed systems, a relatively small temperature differential between the two fluids at the top of the temperature ladder will be sufficient for a continuous heat transfer from the outflowing hot vapor at the higher pressure to the incoming raw liquid solution at the lower pressure.

The foregoing will perhaps be better understood by reference to FIG. 1b which illustrates a temperature-entropy diagram for pure water.

In accordance with the preferred embodiment of the invention illustrated in FIG. 3, the phase separation is effected in the vicinity of the critical pressure in two successive steps, one step being at a temperature below the saturation temperature of the solution, and the other step being at a temperature slightly above. In this embodiment the first step of the phase separation is effected at say 400° C. (it may vary) in heat-exchanger H2 to be described, and the second step is effected at approximately 432° C., in tank S1 to be described. The saturation temperature of a sodium-chloride-water solution is approximately 428° C. at the critical pressure, saline water including other salts having of course a slightly different saturation temperature.

The temperature-entropy diagram of FIG. 1b is based on separating at a pressure of about 225 kg./cm.$^2$ (as in the embodiment of FIG. 3), but additionally compressing the water vapor to a pressure of about 260 kg./cm.$^2$, whereas the embodiment described in FIG. 3 compresses it to about 245 kg./cm.$^2$. (In the FIG. 3 embodiment, a larger quantity of energy in the form of heat is supplied for the purpose of producing a mechanical work output, which accounts for the lower pressure.) Accordingly, although the pressures are not exactly alike between the diagram and the FIG. 3 embodiment, nevertheless the diagram will be helpful in explaining what happens and how the "squeeze" problem is avoided in the systems of both FIGS. 2 and 3.

In the diagram of FIG. 1b, curve A represents the temperature-entropy relationship of pure water at the critical pressure (about 225 kg./cm.$^2$), and curve A' represents this relationship at the higher pressure of about 260 kg./cm.$^2$. Curve B is the vapor saturation curve. The diagram is arbitrarily cut horizontally at the temperature levels of 350° C. (623° A.) and —153° C. (120° A.).

The point $a1$ on the critical pressure curve A corresponds to the ordinate $T=380°$ C. (643° A.) and to the abscissa $S=0.9628$ kcal./kg. ° C. The point $a2$ on curve A corresponds to the ordinate $T=380°$ C. (653° A.) and to the abscissa $S=1.2037$ kcal./kg. ° C. The shaded area below the points between $a1$ and $a2$ of curve A equals the amount of heat Q needed to raise the temperature of pure water from 370° C. to 380° C. at the critical pressure. This amount of heat is obtained from the formula $$S = \int \frac{dQ}{T}$$

or from the steam tables, it is 155.8 kcal./kg. This is the "squeeze" area referred to earlier.

In the example described, phase separation is completed at about 432° C. This point is indicated as $a3$ in curve A. For the purpose of this examination it will be assumed that the water vapor alone is used to heat the saline water to the phase separation temperature, and that the water vapor must always be at a temperature differential of at least 10° C. to provide the proper heat-exchange relationship between the two media.

In the conventional critical pressure phase separation system, the water vapor would have to be heated from 432° C. (point $a3$) to a point on curve A where the area underneath the curve between the two points equals the area underneath curve A between points $a1$ and $a2$, i.e. the "squeeze" area. Disregarding the heat losses, this point would be 613° C. (886° A.), which is indicated on curve A by the reference $a4$, the shaded area between points $a3$ and $a4$ equaling the shaded area between points $a1$ and $a2$. Thus, the water vapor would have to be heated almost 200° C. above the phase separation temperature, to maintain a temperature differential of 10° C. at the "squeeze" region, which heretofore made this system impractical for water desalination on any large commercial scale.

By the additional compression, however, the water vapor is compressed raising the temperature to point $a'4$ on curve A', in this example about 456° C. If the water vapor were now used to heat the saline water, its cooling path would pass down along curve A', the temperature differential (starting at 456° C.–432° C.) decreasing until a point is reached, called $a'2$, where it is to be 10° over 370° C., the bottom of the "squeeze," i.e. $a'2$ equals 380° C. Another point $a'1$ is marked where the ordinate of this point intersects curve A.

Since the amount of heat transferred from the water vapor equals the amount of heat received by the saline water, the area underlying curve A between points $a1$ and $a3$ must equal the area underlying curve A' between points $a'2$ and $a'4$. In this case, where the water vapor is compressed from 225 kg./cm.$^2$ to 260 kg./cm.$^2$, this cannot be attained without additional energy input. Accordingly, the water vapor, after the compression, is heated (as by heating coil F1 in FIG. 3) to increase its temperature to point $a''4$ on curve A'. The amount of additional heat necessary is such that $a''4$ will be at the point where the area underlying curve A between points $a1$ and $a3$ will equal the area underlying curve A' between points $a'2$ and $a''4$. This means that the area (double-shaded) underlying points $a'4$ and $a''4$ on curve A' will equal the area (double-shaded) underlying points $a1$ and $a'1$ on curve A, less the area between curves A and A' from points $a'2$ and $a'4$, and points $a1$ and $a3$.

In this example, the latter-mentioned area (representing a part of the energy by the additional compression) is about 6 kcal./kg., and the first-mentioned double-shaded area (representing the energy by the additional heating) is about 7.9 kcal./kg. Thus, by this additional compression which shifts the temperature-entropy relationship of the water vapor, only about 9.5 kcal./kg. of heat would have to be added in this example.

(C) COMPARISON WITH THE KNOWN VAPOR-COMPRESSION SYSTEM

The above described process is to be clearly distinguished from the known vapor-compression method of distilling water, in which the vapor produced in the evaporator is compressed and the heat of its condensation is used as the heat supply to boil the solution in the same evaporator.

In the vapor-compression distillation system, the compressed vapor is condensed at a constant temperature along a horizontal temperature line (the condensation temperature of pure water), and similarly the saline water is vaporised at a constant temperature along a horizontal temperature line (the boiling temperature of the outflowing concentrated brine). The compressed vapor must be at a sufficiently high temperature to maintain the required heat-exchange temperature differential with respect to the boiling temperature of the concentrated brine. This means that the compressed-vapor temperature must be at the heat-exchange temperature differential with respect to the boiling point of the highest concentration of saline water resulting from the distillation. For example, if 90% of the pure water is to be separated from the saline water, the resulting concentration of saline water would have a boiling point of about 108° C. at atmospheric pressure. Assuming a 5° C. heat-exchange temperature differential, the compressed-vapor should have a temperature of about 113° C. Under these conditions, the work of adiabatic compression, at 100% efficiency, would be about 24 kwh. per 1,000 kg. of water vapor to be compressed from about 1 atmosphere (1.0332 kg./cm.²) to about 1½ atmospheres (1.6144 kg./cm.²).

In the present process, however, the compressed vapor follows a descending (not horizontal) temperature line as it cools, and the saline water being heated follows an ascending line, as described earlier with respect to FIG. 1 and as apparent from Table 2. It will also be noted that the former line is always higher (by at least 10° in the example described above), sufficiently to maintain the heat-exchange temperature differential by the additional compression. The work of compression in this example, with a temperature differential of at least 10° C., would be about 10 kwh., at 100% efficiency.

Thus, in the present method about 10 kwh. of work would be needed for an output of 90–100% of the pure water, while maintaining a temperature differential of 10° C.; whereas in the known vapor-compression system, about 24 kwh. of work would be needed for an output of about 90% of pure water, with a temperature differential of only 5° C.

There are further important differences, particularly when using intermediary fluids in the vapor-compression process as compared to using them in the present process. Since the condensation and boiling temperature curves of the compressed-vapor and concentrated saline water, respectively, are substantially horizontal in the known vapor-compression method, a much larger quantity of intermediary fluid would be necessary than in the present invention wherein the temperature curves follow descending and ascending lines respectively. In the given example of utilizing compressed vapor at 113° C. to heat saline water at 108° C., there would be required about 534,000 kcal. per 1,000 kg. of pure water produced. Assuming the intermediary fluid is paraffin and that a mean temperature differential of about 2.5° C. is maintained between the paraffin and the condensing vapor on the one hand, and the boiling saline water on the other (the paraffin being heated from 110 to 111° C. and cooled from 111 to 110° C., respectively), about 1,000 m.³ (800 tons) of paraffin would be required per 1,000 kg. of pure water produced.

In the present process, where the cooling and heating temperature curves are in descending and ascending lines, respectively, counter-current heat-exchange may be continuously effected, and it is calculated that about 10 m.³ of paraffin would be necessary per 1,000 kg. of pure water produced. The paraffin is heated and cooled by more than 100° C., respectively, in the examples of FIG. 2 and FIG. 3.

Still further, the work of compressing the 1,000 m.³ of paraffin in the known vapor-compression method, from 1.0332 kg./cm.² to 1.6144 kg./cm.², would be about 16 kwh. for 100% efficiency. This work, as a practical matter, would be hardly possible to recover because of the small pressure differential (about one-half atmosphere). In the present process, however, the intermediary fluid (paraffin) is compressed more than 20 atmospheres in the examples described, and therefore the work invested in this compression may more easily be recovered and utilized during its expansion.

It has been further suggested (e.g. see Gilliland U.S. Pat. No. 2,976,224) to use, in a vapor-compression system, the heat from solidifying material to vaporize saline water and then to use the heat of condensation of the compressed water vapor for remelting the previously solidified material. Here, however, the volume of the circulating intermediary fluid is much larger than required in the present process, by 30 to 90 times, depending on the molten material used.

For the foregoing reasons, vapor-compression systems have heretofore been attractive mostly for moderate size installations (e.g. shipboard), and have not been generally used for large size installations or where it is critical to produce pure water at the lowest possible cost. The system of the present invention is believed capable of producing pure water at a fraction of the cost of vapor-compression systems.

As brought out earlier, the critical point of water is at a pressure of about 225 kcal./cm.² (approximately) and at a temperature of about 374° C. (approximately). The critical points of saline water are slightly higher. In the embodiments of the invention discussed above, i.e. with respect to FIG. 3, the phase separation is carried out at a pressure slightly above the critical pressure of 225 kg./cm.², and in two stages of temperatures, namely 400° C. and 432° C. In another embodiment, that of FIG. 2, the points are somewhat different, being at about 227 kg./cm.², with one phase separation temperature being at about 395° C. and with the highest temperature being about 410° C. In any event, it is not essential that phase separation be conducted at exactly these points to obtain the below-described advantages of the present invention. For example, a phase-separating temperature of about 364° C. and pressure of about 200 kg./cm.² (193 atmospheres) could be used (the vapor being compressed to a higher pressure preferably above the critical pressure), but the efficiency of the process would be reduced by lowering the phase-separation pressure and temperature below the critical points. Operating at higher than the critical points will tend to increase the salinity of the produced water and the cost of the equipment, as discussed above.

Accordingly, when the term "vicinity" is used herein with respect to the expressions of critical point, critical pressure, and critical temperature, it will be understood to include not only the exact critical points, but also a little below or a little above them.

(D) THE HEAT-EXCHANGE MEDIA

An important feature of the invention, as indicated earlier, is that intermediary fluids are used as heat-exchange media between the cold saline water and the produced hot pure water (vapor and liquid) and hot saline brine, the fluids being practically immiscible, chemically inert, and of different density than the water. The heat exchangers may be upright cylindrical receptacles having a large diameter (e.g. 1 meter), wherein either hot or cold intermediary fluids flow (either freely or between morsels of coke, for instance, filling up the upright cylindrical receptacles) in counter-current heat-exchange and in direct contact with the incoming cold saline water, or with the outflowing hot fresh water (vapor and liquid) and hot saline brine, respectively. There are no tubes within such a heat-exchanger, so that there would be no problem of scale or corrosion.

Another form of direct-contact counter-current heat-exchanger that may be used is that described in my U.S. patent application No. 346,953 filed Feb. 24, 1964, now abandoned.

Many fluids have the above-mentioned properties at determined temperature regions between the ordinary temperature and the critical temperature of the water, so that by forcing the saline water to flow through a series of upright tanks from bottom to top (or from top to bottom) and injecting into each one of the tanks at the top (or at the bottom, according to the density of the intermediate fluid), it is possible to heat the saline water gradually from ordinary temperature to above the critical temperature, while flowing from tank to tank through a series of tanks in counter-current to a series of fluids injected into the tanks, each one of the injected fluids being at a higher temperature than the preceding fluid in the series of fluids used.

The heat transfer in the described embodiments is carried out by two or more cycles of heating and cooling and also of compression and expansion of an intermediary fluid or fluids, each cycle being operated within a determined temperature region, the quantity of the fluid circulating per hour through each one of said cycles being equal to the quantity of saline water driven into the desalinization plant per hour, multiplied by the mean specific heat of the water, and divided by the mean specific heat of the intermediary fluid at the temperature region of each cycle, to provide substantial equalization of heat capacities.

Example 1

One example of an intermediary fluid is a liquid such as mercury or tars having a higher critical temperature than the critical temperature of the water and a lower vapor pressure at all temperatures, and having a greater density than the density of the water between the ordinary temperature and the highest temperature of the process.

Such a fluid could be used as an intermediary fluid in the region between ordinary temperature and above the critical temperature of water, i.e. at all the temperatures of the process. Mercury, for instance, is not miscible and does not react chemically with saline water. The small quantity of mercurous chloride that may be produced, within the heat-exchangers by chemical reaction between the saline water and the mercury vapor at high temperature and under high pressure could be separated from the other precipitated salts by sublimation, and the mercury could thus be regenerated.

The specific heat of mercury between ordinary temperature and the highest temperature of the process (e.g. in the FIG. 2 embodiment) is approximately 0.033 kcal./kg. This material could be used in the process as the heat transfer medium by operating three mercury cycles per 1000 liters of saline water driven into the desalinization plant per hour, as follows: a first cycle of about 30 tons of mercury (about 2.3 m.$^3$) per hour in the region 19° C.–200° C.; a second cycle of about 40 tons of mercury (about 3.1 m.$^3$) in the region 200° C.–345° C.; and a third cycle of about 90 tons of mercury (about 7 m.$^3$) in the region 345° C.–403° C.

For example, 1000 liters of saline water at 17° C., are compressed from 1 to 220 atmospheres (1.033 to 227 kg./cm.$^2$) and heated to about 196° C., by counter-current heat-exchange with about 30 tons of mercury at 200° C. (the first mercury cycle—see above). Then the saline water is heated from 196° C. to about 335° C. by counter-current heat-exchange with about 40 tons of mercury at 345° C. (the second mercury cycle—see above). Then the saline water is heated from 335° C. to about 395° C. by about 90 tons of mercury at 403° C. (the third mercury cycle—see above).

By elevating the temperature of the saline water under the pressure of 220 atmospheres from 1 to 395° C., it expands from 1000 to about 7700 liters and could be separated, while flowing through a horizontal tank, into an upper light fraction (about 90% of the incoming saline water) containing less than 400 p.p.m. of salts (i.e. good fresh water), and a lower heavy fraction (about 10% of the incoming saline water) of a concentrated saline brine. Finally the light fraction is submitted to further rise of temperature up to 410° C., for instance, by additional compression. Then both fractions separately (the light fraction at 410° C. and the heavy fraction at 395° C.) are cooled to about 350° C. by counter-current heat-exchange with about 81 tons of mercury at 345° C. for the fresh water, and about 9 tons of mercury at 345° C. for the saline brine, the mercury being thus heated to about 403° C. Then the fresh water and the saline brine are cooled to about 204° C. by counter-current heat exchange with about 36 tons and about 4 tons of mercury, respectively, at about 200° C., the mercury being thus heated to about 345° C. Finally the fresh water and saline brine are cooled from 204° C. to about 21° C. by counter-current heat-exchange with 27 tons and 3 tons of mercury respectively at about 19° C. The energy liberated by the cooled fresh water and saline brine, while expanding to 1 atmosphere before being evacuated from the plant, is used to return a substantial proportion of the work of compression supplied to the system.

Example 2

The intermediary fluid or fluids could be substances such as paraffin having a higher critical temperature than the critical temperature of the water and a lower vapor pressure at all temperatures, and having a smaller density than the density of the water at ordinary temperature. Such a fluid could be used as an intermediary fluid in the region between ordinary temperature and about 300° C. and also in the region above 350° C., for instance. At the lower temperature region the density of the water is higher than that of the paraffin, so that the water will flow from top to bottom of the heat exchanger in counter-current heat-exchange to the flowing-up paraffin. At the higher temperature region the density of the water is lower than that of the paraffin, so that the water will flow from bottom to top of the heat-exchanger in counter-current heat-exchange to the flowing-down paraffin.

Paraffin is more miscible in water at higher temperatures than at ordinary temperatures. However, the water is removed from the system at a few degrees above ordinary temperature, and therefore the paraffin contained in the water at the higher temperature may be easily separated at the lower temperature.

Example 3

Fluids in the gaseous state having a critical temperature below ordinary temperature (such as air, preferably nitrogen), not miscible with and chemically inert to water and saline water (especially sea water) in the temperature region between ordinary temperature and a little below the critical temperature of water, could be used as intermediary fluids in the region between ordinary temperature and a little below the critical temperature of the water.

In the following examples described with respect to both the FIGS. 2 and 3 embodiments, it is proposed to use compressed fluids in the gaseous state, preferably nitrogen, as the intermediary fluid for the heat-exchange between the incoming sea water and the outflowing desalinated water and saline brine in the region between ordinary temperature and a little below the critical temperature of the water; and to use fluids in the liquid state, such as paraffin, in the region between a little below the critical temperature to the highest temperature of the process. The former (the compressed gases or nitrogen) has a smaller density than the density of the water below its critical point, and the latter (the paraffin wax, for instance) has a greater density than the density of the water in the region between a little below the critical temperature of the water and the highest temperature of the process.

As indicated earlier, according to one feature of the present invention, the cycle of the gas or gases includes expansion of the same and converting into mechanical power a part of the thermal energy supplied to the system, thus producing all or most of the mechanical work needed to perform the cycles of the waters and of the intermediary fluids so that instead of using the very expensive mechanical power, the much cheaper fuel energy may be used.

(E) THE FIG. 2 EMBODIMENT

FIG. 2 (i.e., FIGS. 2a and 2b taken together) is a diagrammatic showing, by way of example, of a plant for carrying out the invention, using successively nitrogen and paraffin as intermediary fluids, these having the required properties between ordinary temperature and the final temperature of the process.

The specific heat of the paraffin used in the following example is about 0.7 kcal./kg. in the temperature region of 340–440° C. and in the pressure region 220–245 atmospheres (227–253 kg./cm.$^2$); and the specific heat of nitrogen is about 0.25 kcal./kg. in the region of 0–350° C. and 220–245 atmospheres.

The plant illustrated in FIG. 2 comprises essentially a saline water cycle, a desalinated water cycle, a saline brine cycle, a paraffin cycle and a nitrogen cycle, including compressors, prime movers, pumps, heat exchangers, heating units, and saline water separators.

(1) *Water and brine cycles*.—The saline water or sea water at ordinary temperature, for instance 17° C. ($t_0$), flows into the plant through pipe 1, manifold 2, valves 3 or 3′, and into a double-acting pump $P_1$, having a cylinder 4 and a piston 5. The latter is positively reciprocated by means of piston rod 6 connected to piston 7 moving within cylinder 8 of prime mover $M_1$.

When the right cylinder chamber of pump $P_1$ acts as delivery chamber, it is connected through a stop valve 9, manifold 10, conduit 11, and sprayer or distributor 12, with the top end of an upright heat exchanger $h1$. Here the saline water, which is compressed by pump $P_1$ from 1 atmosphere to above the critical pressure (for instance to 220 atmospheres, the initial pressure of the system), is heated by counter-current heat exchange with hot nitrogen at a temperature of 363° C. ($t_9$) for instance, and at a pressure of 220 atmospheres. The nitrogen is injected above the bottom of heat exchanger tank $h1$ by means of injector $a_1$, and flows up through heat exchanger tank $h1$ in counter-current to the flowing down saline water.

The flowing-down saline water passes through funnel 13 into the conical cell 14, wherein are deposited and collected solid particles contained in or precipitated from the saline water. The deposited solids are evacuated from time to time, together with small quantities of saline water, by opening valve 15.

Then the sea water at a temperature of e.g. 356° C. ($t_7$) flows through conduit 16, distributor 17, and through heat-exchanger $h2$ (from bottom to top), and is heated to a temperature of e.g. 395° C. ($t_{14}$) by counter-current heat-exchange with paraffin at a temperature of about 407° C. ($t'_{15}$), and at 220 atmospheres pressure, injected by injector $a_3$ at the top of heat exchanger $h2$.

The paraffin, cooled to e.g. 358° C. ($t_8$) while flowing through heat-exchanger $h2$, passes through the funnel $b$ into cell $c$, where solid particles precipitated from the sea water are deposited and collected. They are evacuated in the following manner, for example:

Valve $G_1$ is closed and valves $d$ and $G_2$ are opened (valve $G_4$ and $G_3$ remaining closed). In this manner the deposited solids together with paraffin flow from cell $c$ into tank E through valve $d$ and conduit F. The solid particles are deposited at the conical bottom of tank E, and pure paraffin is passed through valve $G_2$ by pump $P_2$ (see below). Then valves $G_3$ and $G_1$ are opened and valve $d$ is closed. Cold sea water at 220 atmospheres that flows through conduit 11′, having a greater specific gravity than the specific gravity of the paraffin, is collected at the bottom of tank E, while pure paraffin forms an upper layer. Then valve $G_4$ is opened and valve $G_3$ is closed to evacuate the deposited solid particles together with a small quantity of sea water. Finally by closing valves $G_4$ and $G_2$ we return to the normal functioning of the apparatus.

Heat-exchanger $h2$ also serves as the main phase separation chamber or column, since at 220 atmospheres the phase separation of sea water, starts at about 378° C., and at 395° C. approximately 85% of the sea water is separated as practically pure water vapor from a residual brine containing approximately 25% of dissolved salts (see Table 2 above).

The hot mixture of brine and water vapor flows out at the top of heat-exchanger $h2$ at a temperature of e.g. 395° C. ($t_{14}$), or a little below, either through conduit 18 (in dotted lines) or through heating coil 19. This coil is heated by fuel heat (in addition to the heating of coils 19′ and 19″) with the purpose of raising the temperature of the hot mixture of brine and vapor flowing into tank $s$ and for starting the apparatus. The mixture of brine and vapor then passes through conduit 20, valve 21, and finally into the horizontal separator and settling tank $s$, flowing out separately at the bottom and at the top of its right end, through valves 42 and 26 respectively.

The hot water vapor at about 395° C. and at 220 atmospheres, having a specific volume of about 7.7 litres per kg., flows from right to left of tank $s$ and is separated into an upper layer of water vapor poor in salts, and a denser lower layer of a brine containing in solution most of the salts of the treated saline water and in suspension the salts not separated in tank $h2$, and the salt crystals precipitating from the denser lower layer. These are deposited and collected in the conical cells 22, 23, to be evacuated together with a small quantity of the saline brine by opening from time to time the valves 24, 25, respectively.

At the upper and left end of tank $s$, desalinated water (vapor) flows out (containing less than 0.04% of salts) through valve 26, conduit 27, manifold 28, and valve 29 or 29′, into the cylinder of compressor $c1$. While desalinated water vapor flows into the left cylinder chamber of compressor $c1$ (having cylinder 30 and piston 31), the right cylinder chamber acts as delivery chamber wherein the water vapor is compressed from 220 to 245 atm. (i.e. 227 to 253 kg./cm.$^2$) the highest pressure ($ph$) in the system of FIG. 2. This causes the elevation of its temperature from e.g. 395° C. ($t_{14}$) to the highest temperature of the system, e.g. 410° ($t_h$).

This is the additional compression which avoids the "squeeze" problem as discussed above with respect to FIG. 1.

The highly compressed desalinated water (vapor) is delivered through valve 32, manifold 33, conduit 34, and distributor 35, into heat-exchanger $h3$ at its bottom. The hot desalinated water vapor at about 410° C. flows up from the bottom to the top of heat-exchanger $h3$ in counter-current to the flowing-down paraffin injected at a temperature of e.g. 358° C. ($t_8$) and at 245 atmospheres (253 kg./cm.$^2$) through injector $a'_3$ (see below the paraffin cycle).

The desalinated water is cooled by counter-current heat-exchange with the flowing down paraffin to a temperature of e.g. 370° C. ($t_{11}$). It then flows through conduit 36 and distributor 37 into heat-exchanger $h4$ at its top, flowing down through this heat-exchanger from top to bottom in counter-current heat-exchange with the flowing up nitrogen. The latter is injected by injector $a'_1$ at a temperature of e.g. 28° C. ($t_2$) and by injector $a'_2$ at e.g. 229° C. ($t_6$) and at 245 atmospheres pressure (see below the cycle of the nitrogen).

The desalinated water at about 30° C. ($t_3$) and 245 atmospheres flows out at the bottom of heat exchanger $h4$ through conduit 38, manifold 39, valve 40, and into the left cylinder of prime mover $M_1$, driving from left to right the piston 7 which is connected by piston rod 6 to piston 5 of pump $P_1$. In this manner the desalinated water at a temperature a little above ordinary temperature and under a pressure of 245 atmospheres, while flowing into the left cylinder chamber of prime mover $M_1$, drives the cold saline water from the right cylinder chamber of pump $P_1$ into the heat exchanger $h1$, wherein the pressure is only 220 atmospheres.

At the lower left end of tank $s$ flows out the residual saline brine through the conical cell 41, valve 42, conduit 43, manifold 44, stop valves 45 or 45′ and into reservoirs $r1$ or $r'1$. The latter are connected by the short tubes 46 or 46′ with the left or the right cylinder chamber of compressor $c2$, respectively.

The cylinder 47 of the compressor $c2$ and the lowest part of the reservoirs $r1$ and $r'1$ are filled with a liquid (for instance, paraffin wax) that is inert with respect to the compressor and is not miscible and does not react chemically with the saline brine. The pressure of the piston 48 of the compressor $c2$ on the inert liquid within the cylinder chamber is transmitted by this liquid to the saline brine within the reservoir, and vice versa. In this manner, contact between the corrosive hot saline brine and the cylinder and piston of the compressor $c2$ is avoided. The saline brine at a pressure of 220 atmospheres flows into reservoir $r1$, for instance, while the piston 48 drives out the inert fluid from the right cylinder chamber of the compressor $c2$ through pipe 46' into the reservoir $r'1$. The inert fluid flowing into reservoir $r'1$ compresses the saline brine within the reservoir from 220 to 245 atmospheres and then drives out the compressed saline brine through stop valve 49', the reservoir $r'1$ being filled up with the inert fluid when the piston 48 is at the right end of its course. When the piston 48 is at the left end of its course, the reservoir $r1$ is filled with the insert fluid, and at this moment the volume of the saline brine flowing into reservoir $r'1$ at a pressure of 220 atmospheres is equal to the volume of the cylinder chamber of compressor $c2$.

If the intermediary fluid used is mercury or any other fluid that its contact with the pumps, compressors and prime movers of the apparatus should be avoided (even nitrogen containing small quantities of saline water is dangerous to the compressors and prime movers), then to each one of them two reservoirs could be added and they could be operated in the manner described above. The two reservoirs would be placed above or below the pump, compressor or prime mover, if the intermediary fluid is lighter or heavier than the inert liquid used, respectively.

The additionally compressed saline brine flows from reservoir $r1$ or $r'1$ through stop valve 49 or 49', respectively, manifold 50, conduit 51 and injector 12' into heat exchanger $h5$ at its top. There it flows down in countercurrent to the flowing-up nitrogen injected by injector $b_1$ at the bottom of the heat exchanger (at about 28° C., $t_2$), by injector $b_2$ at about one third of its height (at about 229° C., $t_6$), and by injector $b_3$ at about half of its height (at about 368° C., $t_{10}$). The saline brine flows out at the bottom of heat exchanger $h5$ at a temperature of e.g. 30° C. ($t_3$) through funnel 13', cell 14', conduit 52, manifold 53, valve 54, and into reservoir $r2$. It drives the inert fluid which is lighter than the saline brine through tube 55 into the left cylinder chamber of prime mover $M_2$, the latter including cylinder 56 and piston 57 which is driven by the inert fluid from left to right. While the saline brine at a pressure of 245 atmospheres (253 kg./cm.$^2$) flows into reservoir $r2$, the stop valve 58' is open, and the saline brine within the reservoir $r'2$ flows out through valve 58', manifold 59 and conduit 60, at a pressure of one atmosphere. The work of expansion is utilized to help drive piston rod 6 connected to the pistons of the pumps, compressors and prime mover of the apparatus.

The cooled saline brine at a temperature of e.g. 30° C. ($t_3$) flows out from reservoirs $r2$ or $r'2$ of prime mover $M_2$ through valve 58 or 58', manifold 59, and conduit 60 at a pressure of one atmosphere. The cooled fresh water at a temperature of e.g. 30° C. ($t_3$) flows out from prime mover $M_1$ through valve 61 or 61', manifold 62, and conduit 63, at a pressure of 1 atmosphere. The work of expansion from 245 to 1 atmosphere is utilized in the plant by means of piston rod 6, for instance.

The precipitated salts within the conical cell 14' are evacuated together with a small quantity of saline brine by opening and closing valve 15'.

(2) *Paraffin cycle.*—The cycle of paraffin is performed by means of prime mover $M_3$ with cylinder 64 and piston 65 connected to piston rod 6.

For the heat exchange between about 1 ton of desalinated water vapor at about 410° C. and 1.1 ton of saline water at about 356° C. per second (or per minute, or per hour, for instance), a cycle of about 4.3 tons (about 6.5 cubic meters) or paraffin is performed per second (or per minute, or per hour respectively) in the following manner: The paraffin at 245 atmospheres and at e.g. 403° C. ($t_{15}$) flows out at the bottom of heat exchangers $h3$ (see above) through conduits 66 and coil 19', where the flowing paraffin is heated by fuel heat to 407° C. ($t'_{15}$) in addition to or instead of the heating of coil 19 (see above). It then flows through manifold 67, stop valve 68, into the left cylinder chamber of prime mover $M_3$, driving piston 65 from left to right. At the same time the right cylinder chamber of prime mover $M_3$ acts as a delivery chamber and is connected through stop valve 69, manifold 70, conduit 71, heating coil 19'' and injector $a3$ with the top of heat exchanger $h2$. Here the paraffin, after expansion within the cylinder chamber of prime mover $M_3$ from 245 to 220 atmospheres, is injected and then flows down through heat exchanger $h2$, in counter-current to the flowing-up sea water (see above). The flowing-down paraffin is cooled from e.g. 407° C. ($t'_{15}$) to e.g. 358° C. ($t_8$) by the flowing-up saline water. The latter is injected through injector 17 and is heated from the temperature of e.g. 356° C. ($t7$) to e.g. 395° C. ($t_{14}$).

The cooled paraffin flows through funnel $b$, cell $c$ and valve $G_1$, or through valve $d$, conduit F, cell E and valve $G_2$ (see above), manifold 72, conduit 73, manifold 74, and valve 75, and then into the left cylinder chamber of pump $P_2$ including cylinder 76 and piston 77 connected by piston rod 6 to piston 65 of prime mover $M_3$. In this position, the right cylinder chamber, wherein the paraffin is compressed from 220 to 245 atmospheres, acts as delivery chamber and is connected through stop valve 78, manifold 79, conduit 80, and injector $a'3$, with the top of heat exchanger $h3$. The injected paraffin flows down through the heat exchangers $h3$ and is heated from about 358° C. ($t_8$) to about 403° C. ($t_{15}$) by countercurrent heat exchange with the flowing-up desalinated water (vapor) through heat exchanger $h3$, flowing in at the bottom of this heat exchanger at about 410° C. ($t_h$) through distributor 35, and flowing out at e.g. 370° C. ($t_{11}$) at the top through conduit 36 (see above). The heated paraffin at about 403° C. and 245 atmospheres flows out at the bottom of heat exchangers $h3$, thus completing one paraffin cycle and starting a new paraffin cycle.

Although the quantity of paraffin driving the piston 65 of prime mover $M_3$ is the same as the quantity of paraffin driven by the piston 77 of pump $P_2$, the volume of the latter at the same pressure of 245 atmospheres is smaller, because its temperature (about 358° C.) is about 45° C. lower. Consequently, the prime mover $M_3$ produces theoretically more mechanical energy than the mechanical energy needed for the functioning of pump $P_2$ per same cycle.

(3) *Nitrogen cycle.*—For the heat exchange between about 1 ton of desalinated water vapor and about 0.1 ton of saline brine and 1.1 ton of the incoming saline or sea water per unit time (per second, per minute, or per hour). a cycle of about 5.72 tons of nitrogen (100% of the nitrogen cycle) per unit time (per second, per minute, or per hour, respectively, is performed in the following manner: About 5.15 tons of nitrogen (90% of the nitrogen cycle) at 245 atmospheres and at a temperature of e.g. 368° C. ($t_{10}$) flow out at the top of heat exchanger $h4$ through conduit 81. It is injected through injector $b_3$ at about one-half the height of heat exchanger $h5$ and flows up together with about 0.57 ton of nitrogen (about 10%) injected through injector $b_1$ (about 7.7% or about 0.44 ton at about 28° C. ($t_2$)) and through injector $b_2$ (about 2.3% or about 0.13 ton at about 229° C., $t_5$).

The flowing-up 5.72 tons of nitrogen through heat exchanger $h5$ are heated from e.g. 368° C. ($t_{10}$) to e.g. 378° C. ($t_{12}$) by counter-current heat exchange with the flowing down 100 kg. of saline brine at about 395° C. per cycle of 1.1 tons of incoming saline water. The 100 kg. of the saline brine are thus cooled from 395° C. to 370° C. supplying to the 5.72 tons of nitrogen about 14,000 kcal.

Now, these 14,000 kcal will be supplied to the hot saline water from an external source of energy (fuel heat, for instance), while flowing through the heating coils 19, 19' and 19" (see above).

The 5.72 tons of nitrogen flowing out of the top of heat exchanger $h5$ at about 378° C. ($t_{12}$) flows through conduit 82 and coil 83, where its temperature is elevated to 383° C. ($t_{13}$) by supplying about 7,000 kcal. of fuel heat.

Assuming 20% losses of heat by the heating, the total fuel heat supplied to coils 19, 19', 19" and 83 per 1000 litres of fresh water produced from 1100 litres of sea water is about 26,000 kcal., or about 30 kwh.

The nitrogen at 345 atmospheres and at 383° C. ($t_{13}$) flows through conduit 84, manifold 85, stop valve 86 into the left cylinder chamber of prime mover $M_4$ having cylinder 87 and piston 88. Here the nitrogen expands (adiabatic expansion) from 245 to 220 atmospheres, and is thus cooled to 363° C. ($t_9$). At the same time the right cylinder chamber of prime mover $M_4$ acts as a delivery chamber and is connected through stop valve 89, manifold 90, conduit 91, and injector $a_1$ with the bottom of heat exchanger $h_1$. The nitrogen flows up through this heat exchanger in counter-current to the flowing down saline water (see above). The nitrogen is thus cooled to a temperature of e.g. 214° C. ($t_5$) at the level of tube $a_2$ by the flowing-down saline water, the latter being heated from a temperature of e.g. 200° C. ($t_4$) at the level of tube $a_2$ to a temperature of e.g. 356° C. ($t_7$) at the bottom of heat exchanger $h1$.

About 23% or 1.32 tons per cycle of the total nitrogen injected at the bottom of heat exchanger $h1$ is intercepted and passes through tube $a_2$, and the other 77% or 4.4 tons of the nitrogen per cycle continues to flow up through heat exchanger $h1$ in counter-current to the flowing-down saline water flowing into heat exchanger $h1$ through distributor 12 at ordinary temperature e.g. 17° C. ($t_0$). The so cooled nitrogen flows out at the top of the heat exchanger $h1$ at a temperature of e.g. 19° C. ($t_1$) through conduit 92, manifold 93, stop valve 94, into the left cylinder chamber of compressor $c3$ (including cylinder 95 and piston 96) to be compressed adiabatically from 220 to 245 atmospheres. The temperature is raised by this compression from e.g. 19° C. ($t_1$) to e.g. 28° C. ($t_2$). The work of compression of the 77% of nitrogen (4.4 tons of nitrogen per cycle of 5.72 tons) is about 1.16 kwh. At the same time the right cylinder chamber of compressor $c3$ acts as a delivery chamber and is connected through stop valve 97, manifold 98, conduit 99, regulating valve $w1$, conduit 100 and injector $a'_1$ with heat exchanger $h1$ at its bottom and also through regulating valve $w'1$, conduit 100' and injector $b_1$, with heat exchanger $h5$, at its bottom.

About 69.3% or about 3.96 tons of nitrogen per cycle flows through regulating valve $w1$, and about 7.7% or about 0.44 ton of nitrogen per cycle flows through regulating valve $w'1$.

After flowing up through heat exchanger $h4$ in counter-current heat exchange with the flowing down desalinated water injected at the top of heat exchanger $h4$ at e.g. 370° C. ($t_{11}$), the nitrogen flows out at the top of heat exchanger $h4$ through conduit 81, at e.g. 368° C. ($t_{10}$) starting a new nitrogen cycle.

The 23% of nitrogen per cycle exiting from heat exchanger $h1$ through tube $a_2$ flows through conduit 101, manifold 102, stop valve 103 into the left cylinder chamber of compressor $c4$ including cylinder 104 and piston 105 connected to piston rod 6. At the same time the right cylinder chamber of compressor $c4$ acts as a compressor and a delivery chamber, where the nitrogen is compressed from 220 to 245 atmospheres, causing the rise of the temperature from e.g. 214° C. ($t_5$) to e.g. 229° C. ($t_6$). The compressed nitrogen is delivered through stop valve 106, manifold 107, conduit 108, regulating valve $w2$, conduit 109 and injector $a'_2$, into heat exchanger $h4$, at about mid-way of its height, and also through regulating valve $w'2$, conduit 109' and injector $b_2$, into heat exchanger $h5$ at about one-fourth of its height. About 20.7% or about 1.2 tons of nitrogen per cycle flows through regulating valve $w2$, and about 2.3% or about 0.13 ton of nitrogen per cycle flows through regulating valve $w'2$. From the botom of heat exchanger $h4$ up to the level of tube $a'_2$ flows about 3.96 tons nitrogen, or about 69.3%, and from the level of tube $a'_2$ flows up about 5.15 tons, or about 90% of the total nitrogen per cycle. The work of compression of the 23%, or 1.32 tons of nitrogen from 220 to 245 atmospheres by compressor $c4$, is about 5.81 kwh.

(4) *Temperatures, pressures and other data.*— The above temperature and other data figures, as well as the data in the tables below, are approximate with respect to the above described embodiment of the invention and are given by way of example only. The following data relate to the quantities in weight (tons or percent) and in volume (m.³) of the fluids mentioned in the above example, namely, sea water (SW), desalinated water (DW), saline brine (SB), nitrogen ($N_2$) and paraffin (Par.), per cycle of 1.1 ton of incoming sea-water. The fluids are compressed or expanded within and flow through the pumps $P_1$ and $P_2$, compressors $c1$, $c2$, $c3$ and $c4$, and prime movers $M_1$, $M_2$, $M_3$ and $M_4$.

The theoretical work needed (—) and generated (+) is in kwh. The temperatures ($t$.) are in ° C., and the pressure ($p$) in atmospheres. The notations (in) and (out) mean that the fluid flows into the pumps, compressors or prime mover, or flows out from same. The figures with respect to the volume of nitrogen are based on the "$pv$" table appearing in International Critical Tables, volume 3, page 17.

| Fluid | Pump compressor or prime mover | Temperature (° C.) | Pressure (atms.) | Quantities of fluid | | | Work (kwh.) |
|---|---|---|---|---|---|---|---|
| | | | | Tons | Percent | m.³ | |
| SW (in) | $P_1$ | 17 | 1 | 1.125 | 100 | 1.1 | |
| SW (out) | $P_1$ | 17 | 220 | 1.125 | 100 | 1.1 | −6.77 |
| DW (in) | $c1$ | 395 | 220 | 1.0 | 89 | 7.7 | |
| DW (out) | $c1$ | 410 | 245 | 1.0 | 89 | 7.0 | −5.20 |
| SB (in) | $c2$ | 395 | 220 | 0.125 | 11 | | |
| SB (out) | $c2$ | 405 | 245 | 0.125 | 11 | | −0.21 |
| DW (in) | $M_1$ | 30 | 245 | 1.0 | 89 | 1.0 | |
| DW (out) | $M_1$ | 30 | 1 | 1.0 | 89 | 1.0 | +6.86 |
| SB (in) | $M_2$ | 30 | 245 | 0.125 | 11 | 0.1 | |
| SB (out) | $M_2$ | 30 | 1 | 0.125 | 11 | 0.1 | +0.69 |
| $N_2$ (in) | $c3$ | 19 | 220 | 4.4 | 77 | 18.8 | |
| $N_2$ (out) | $c3$ | 28 | 245 | 4.4 | 77 | 17.7 | −12.91 |
| $N_2$ (in) | $c4$ | 214 | 220 | 1.32 | 23 | 8.6 | |
| $N_2$ (out) | $c4$ | 229 | 245 | 1.32 | 23 | 7.9 | −6.77 |
| $N_2$ (in) | $M_4$ | 383 | 245 | 5.72 | 100 | 44.8 | |
| $N_2$ (out) | $M_4$ | 363 | 220 | 5.72 | 100 | 48.5 | +37.50 |
| Par. (in) | $P_2$ | 358 | 220 | 4.3 | 100 | 6.5 | |
| Par. (out) | $P_2$ | 358 | 245 | 4.3 | 100 | 6.4 | −4.53 |
| Par. (in) | $M_3$ | 403 | 245 | 4.3 | 100 | 6.7 | |
| Par. (out) | $M_3$ | 403 | 220 | 4.3 | 100 | 6.8 | +4.7 |

The theoretical excess of work generated is approximately 13.40 kwh.

This theoretical excess of work generated is sufficient to guarantee the working of the pumps and compressors of the plant, assuming 85% average efficiency for the the pumps, compressors and prime movers.

In the above described FIG. 2 embodiment of the present invention, all the mechanical work needed for the production of 1 ton of fresh water from 1.1 tons of saline water was produced by converting into mechanical power about 30 kwh. of heat energy (the heat of about 2.5 kg. of fuel, for instance) supplied to the system.

The amount of fuel heat to be supplied to the system could be reduced by working with a smaller pressure difference, for instance, instead of a pressure difference of 25 atmospheres as in the above described example. The cycle could be performed with a pressure difference of only 15 atmospheres (at 220 and 235 atmospheres, for instance). In this case the rise of the temperature of the nitrogen by compression at 10° C. from 220 to 235 atmospheres will be about 6° C. (i.e. from 19° C. to 25° C., for instance), instead of 9° C. in the above example. This means that the outflowing fresh water and saline brine will be at a temperature lower by 3° C. than in the given example, which reduces the heat losses by the outflowing fresh water and saline brine.

Following is a recapitulation of the important (approximate) temperatures in the above described example:

$t_0 = 17°$ C.—temperature of the incoming saline water.
$t_1 = 19°$ C.—lowest temperature of the nitrogen cycle, cooled by the incoming saline water at $t_0$.
$t_2 = 28°$ C.—temperature of 77% of nitrogen after compression from 220 to 245 atm.
$t_3 = 30°$ C.—temperature of the outflowing desalinated water and saline brine.
$t_4 = 200°$ C.—intermediary temperature of the saline
$t_5 = 214°$ C.—temperature of the cooled 22.5% of the nitrogen by saline water of 200° C.
$t_6 = 229°$ C.—temperature of 23% of the nitrogen after compression from 220 to 245 atm.
$t_7 = 356°$ C.—temperature of saline water heated by nitrogen at $t_9$.
$t_8 = 358°$ C.—lowest temperature of the paraffin cycle, cooled by sea water at $t_7$.
$t_9 = 363°$ C.—temperature of 100% of the nitrogen after expansion from 245 to 225 atm. at the highest temperature of the nitrogen cycle ($t_{13}$).
$t_{10} = 368°$ C.—temperature of nitrogen heated by desalinated water at $t_{11}$.
$t_{11} = 370°$ C.—temperature of desalinated water cooled by paraffin at $t_8$.
$t_{12} = 378°$ C.—temperature of nitrogen heated by saline brine at about 405° C.
$t_{13} = 383°$ C.—temperature of 100% nitrogen after heating by fuel heat from $t_{12}$.
$t_c = 374°$ C.—the critical temperature of the water.
$t_{14} = 395°$ C.—temperature of saline water heated by paraffin at $t_{15}$ and by fuel (by heating coil 19).
$t_{15} = 403°$ C.—temperature of paraffin after heating by desalinated water vapor at the highest temperature of the system $t_h$.
$t_h = 410°$ C.—the highest temperature of the desalinated water vapor obtained by compression at $t_{14}$ from 220 to 245 atm.

In the above described embodiment of the invention, the improved method of converting thermal energy into motive power is utilized to produce all the mechanical work needed to operate the improved desalinization process. This improved method of converting heat energy into work could be performed for any other purpose, by using an intermediary fluid in the liquid state (e.g. water, as in the above described embodiment of the invention, or paraffin, or any liquid that is not miscible and does not react chemically with the gas used as power fluid), as a heat exchange medium between a cold and compressed fluid in the gaseous state (e.g. air or nitrogen) on the one hand, and the same gas, after expansion to a lower pressure (the two pressures being substantially above one atmosphere) at a high temperature, on the other, the expanded gas being cooled by counter-current heat exchange and direct contact with cold water, for instance, to a little above ordinary temperature, while the water is being heated to a little below the temperature of the hot expanded gas. The so cooled gas is compressed and then heated in a first step by counter-current heat exchange with heated water, after being compressed, and in a second step by fuel heat. Finally the so heated compressed gas is allowed to expand, converting into useful work a substantial proportion of the heat energy supplied to the system, this feature enabling the attainment of a high thermal efficiency.

(5) *Starting-up procedure.*—At the very beginning, the operation of the plant is started in the following manner:

(1) Pump $P_2$, prime mover $M_2$, and reservoir $r_3$ are filled with liquid paraffin or any other liquid having the same needed properties (see above) through funnel 110 and valve 111. All the valves of the apparatus are open, except for gas vent $g_7$ and valves $d$, $G_1$, $G_2$, $G_3$, $G_4$, 51′, 42, 25, 24, 15, 15′ and 15″, that are closed). When the filling up with paraffin is finished, valve 111 is closed.

(2) Water (saline water or preferably fresh water) is driven into the plant through valve 1′ and conduit 1. When water starts to flow out through gas vent $g_6$, it is closed; when water starts to flow out through valve 63′, it is closed; and finally when water starts to flow out through vents $g_1$, $g_2$, $g_3$, $g_4$ and $g_5$, they are also closed. At this moment all the receptacles and the conduits of the water cycle (except compressor $c_2$ and prime mover $M_2$) and the nitrogen cycle (see above) are completely filled with water.

(3) Valve 1′ is closed (valves 113 and 114 are open), and a water cycle is operated by pump $P_3$ starting from conduit 63 and driving the water through pump $P_1$, heat exchangers $h1$ and $h2$ and coil 19 that is heated to about e.g. 400° C. The heated water continues to flow through tank $s$, compressor $cl$, heat-exchangers $h3$ and $h4$, and finally through prime mover $M_1$ and conduit 63 into pump $P_3$, starting a new water cycle. By operating a number of cycles, the circulating water is gradually heated by the heating coil 19 to about 370° C., for instance, and the pressure is raised to about 220 atmospheres. Gas vents $g_2$, $g_5$ and $g_6$ are regulated to a maximum pressure of 220 atmospheres, for instance, so that the additional volume of the water caused by the raise of the temperature escapes through these three safety valves.

(4) Nitrogen is driven into the plant at a pressure of 220 atmospheres by compressor $c5$. The nitrogen flows through pipe 115 connected to a nitrogen reservoir (not shown on the drawing), valve 116, compressor $c5$ (valve 84′ is closed), valve 117, conduit 84, prime mover $M_4$, into heat exchanger $h1$, through injector $a_1$ (valve 15 is opened until about half of the water escapes and is replaced by nitrogen, and is then closed), then through conduits 92 and 101 into compressors $c3$ and $c4$, respectively, and into heat exchanger $h4$ (valve 63′ is opened until about half of the water escapes from heat exchanger $h4$ and is replaced by nitrogen, and is then closed), then through conduit 81 and injector $b_3$ into heat exchanger $h5$ (valve 15′ is opened until about half of the water escapes and is replaced by nitrogen, and is then closed). At this stage valve 116 is closed (valves 117 and 118 are open), and the nitrogen is driven through the plant (see the nitrogen cycle) and through coil 83 heated to about 390° C. After a number of cycles the temperature of the nitrogen is raised to about 370° C.

(5) The paraffin is driven from reservoir r3 into heat exchanger h2 by opening valve 119 and valves d and $G_4$. The nitrogen flows into reservoir r3 through valve 119 and drives the paraffin through conduit 120, valve $66_b$, prime mover $M_3$, conduit 71, heating coil 19″, injector a3, into heat exchanger h2 until half of the volume of the water is replaced by paraffin. Then valves d, $G_4$ and $66_b$ are closed. Then valves 121 and $80_b$ are opened and the paraffin flows from reservoir r3 through pipe 122, valve $80_b$, conduit 80 and injector a'3 into heat exchanger h3 until half of the volume of the water is replaced by paraffin. Then valves 119, 121 and $80_b$ are closed.

(6) At this stage the operation of the plant is started as follows:

(a) Stop valves 86 and 89 of prime mover $M_4$ are opened and stop valves 86' and 89' are closed (or vice versa).

(b) Valves 84', 116 and 117 are opened and valve 118 is closed, and compressor c5 drives into the plant an additional quantity of nitrogen to raise the pressure within heat exchangers h4 and h5 from 220 to 245 atmospheres, and to drive piston 88 of prime mover $M_4$ from left to right together with all the other pistons connected by piston rod 6 (see above).

(c) Finally, valve 1' is opened to let in the saline water; valve 63' is opened to let out the produced fresh water; and valves 42 and 15″ of the saline brine cycle are also opened.

(d) When the manometers on the safety valves $g_2$, $g_5$ and $g_6$ indicate a pressure of 220 atmospheres and the manometers of the safety valves $g_1$, $g_3$ and $g_4$ indicate a pressure of 245 atmospheres, and the movement of piston rod 6 has reached its normal speed, then compressor c5 is stopped and the apparatus works by the motive power generated from the heat energy supplied to the system by the heating coils 19, 19', 19″ and 83. The safety valves are regulated to a maximum pressure of 300 atmospheres, for instance. Valves 84', 34', 36', 51' and 15″ are open.

If the apparatus is stopped for a long time, then valves 16', 21, 36' and 34' are closed, and the paraffin is allowed to flow into reservoir r3 by opening valves 66a, valve d, valve $G_2$, valve 80'b and gas vent $g_7$, before the water within heat exchangers h2 and h3 is cooled and its specific gravity becomes greater than the specific gravity of the paraffin at the same temperature and pressure (see above). In such a case, all the water contained at the lower part of heat exchanges h2 and h3 is expelled through valves $G_4$ and 121 respectively before collecting the paraffin into reservoir r3.

My invention permits the construction of desalination systems providing yields of 90% or more, which compares very favorably with prior known systems.

(6) *Salt extraction.*—In the above examples the phase separation conditions are: pressure 220 atmospheres (227 kg./cm.²) and temperature 395° C. If without changing the pressure of 220 atmospheres, the temperature in heat exchanger h2 is raised to a little below the saturation temperature of the sodium chloride (428° C.) and then the mixture flowing into tank s is heated above 428° C., the salts are precipitated in tank s and are collected in the cells 23 and 24. The precipitated salts could be evacuated together with a little of the mother brine in any known intermittent or continuous manner from the cells 23 and 24.

(F) THE IMPROVED EMBODIMENT OF FIG. 3

FIG. 3 illustrates a further embodiment of the invention incorporating several improved features, and particularly the hydraulic devices illustrated in detail in FIGS. 4–7. For the sake of simplifying the description, many of the control valves and other accessories that would normally be included in the system are omitted from this figure.

To facilitate understanding the diagram of FIG. 3, the saline water paths are shown in heavy lines, the desalinated or pure water (or vapor) paths are shown in double lines, the paraffin paths are shown in thin lines, the nitrogen paths are shown in dash-dash lines, and the brine and crystallized salt paths are shown in dot-dot lines.

(1) *Water cycle.*—The raw saline water SW at normal temperature and pressure is drawn from the reservoir R1, such as the ocean, through line 502 to a hydraulic system S–D, illustrated and described below with respect to FIG. 7. The hydraulic system S–D boosts the pressure of the saline water to about 225 kg./cm.² and passes it through line 504 to reservoir R2. The latter reservoir is closed so that the pressure therein is the same as in line 504. From reservoir R2, the saline water flows into the top of a heat-exchanger H1.

Heat-exchanger H1, as those in FIG. 2 and the others to be described, is of the counter-current direct contact type, preferably as described in my pending U.S. patent application Ser. No. 346,953, filed Feb. 24, 1964.

In heat-exchanger H1, the saline water is heated by hot up-flowing nitrogen, as will be described below in detail, and leaves the heat-exchanger through line 508 at a temperature of something less than the phase separation temperature of the saline water, preferably between about 260° C. and 360° C., depending upon the particular design. The pressure of the saline water as it leaves heat-exchanger H1 is about 225 kg./cm.².

The saline water is then passed through a small compressor C1 where its pressure is boosted to about 226 kg./cm.² and is introduced through line 510 into heat-exchanger H2. Here, the saline water is heated by down flowing hot paraffin, and also by a little steam, both of which will be described below in connection with their respective cycles, and leaves heat-exchanger H2 through line 512 at a temperature above the critical temperature (374° C.) but below the saturation temperature of the dissolved salts (428° C. for sodium chloride). The temperature of the water vapor at the critical pressure leaving heat-exchanger H2 through line 512 would preferably be in the order of 400° C.

Water solution-water vapor phase separation occurs in heat-exchanger H2 inasmuch as the saline water is heated to below the saturation temperature. Accordingly, this heat-exchanger will contain quantities of: (a) an upflowing saline liquid having an increasing concentration, being a concentrated brine a little below the top of the heat-exchanger; (b) the separated water vapor, which increases in volume from bottom to top; (c) down-flowing paraffin; and (d) small quantities of calcium carbonates and sulfates mostly entrained from H1. The water vapor rises to the top and flows out through line 512. The concentrated brine is drawn off at a lower level; the paraffin settles at a little above the bottom; and a part of the calcium carbonates and sulfates, and other solids that cannot exist in a water solution at these temperatures, settle at the bottom of heat-exchanger below the paraffin. The removal of these substances from heat-exchanger H2, and their further handling in the system, will be described below in connection with the description of the cycle of each.

The heated saline water and vapor passing through line 512 are introduced into the bottom of a tank S1, which functions as a third heat-exchanger and vapor washing and filtering device, for further heating to a temperature of about 432° C. (over the saturation temperature) by means of down-flowing paraffin. The phase separation of the saline water and the washing and filtering of the separated water vapor are thus completed in tank S1. In addition to the relatively pure water vapor, tank S1 includes entrained small drops of concentrated brine, paraffin, and crystallized salt, all of which are removed in the manner to be described more fully below. The water vapor is removed from tank S1 through line 514 where its temperature is 432° C. or higher, and its pressure is about 226 kg./cm.².

From line 514, the water vapor passes into hydraulic pressure-exchanging device A2–B2 (having the same structure as A4–B4 illustrated in FIG. 6 described below) where its pressure is boosted to about 245 kg./cm.$^2$, and its temperature to about 446° C., and leaves this device through line 516.

It is in pressure-exchanger A2–B2 that the additional compression takes place in this embodiment to overcome the "squeeze" problem previously discussed with respect to FIG. 1.

From line 516, the water vapor is passed through a heater F1 where its temperature is boosted to about 460° C. raising the enthalpy from 705 to 721 kcal./kg. (but this may vary, depending upon the amount of heat added at other points in the circuit, as will be described later), and is then introduced into heat-exchanger H3 through line 518.

In heat-exchanger H3, the water vapor heats paraffin applied from several locations along the length of the heat-exchanger and eventually exits therefrom through line 520 at a temperature somewhat below the critical temperature of the water, for example at some point in the range of 270–370° C. The pressure of the now condensed and desalinated water in line 520 is still approximately 245 kg./cm.$^2$.

The desalinated water then passes through hydraulic pressure-exchanger A3–B3, the structure of which is illustrated in FIG. 5 described below, and exits therefrom through line 522 at a pressure of about 255 kg./cm.$^2$, and is then introduced at the top of heat-exchanger H4.

In pressure-exchanger A3–B3, additional compression takes place which is a further feature of this embodiment as will be more fully described below.

In heat-exchanger H4, the down-flowing desalinated water heats up-flowing nitrogen and exits through line 524 at a temperature of about 37° C. and pressure of about 255 kg./cm.$^2$ into reservoir R3, which is pressurized at the same pressure as the water in line 524.

Reservoir R3 may be considered as part of the hydraulic system S–D since its pressure is used to pump the saline water SW from line 502 into heat-exchanger H1 through line 504. This system is fully illustrated in FIG. 6 and is described in detail below. Suffice it to bring out at this point that the desalinated water from reservoir R3, after passing through system S–D, eventually passes through line 698 into a reservoir R4 which is open to the atmosphere and therefore at atmospheric pressure. The water in reservoir R4 is available through outlet 526 and is substantially pure to be used for drinking, irrigation, and similar purposes. A small portion of the pure water is pumped back from reservoir R4 into the S–D system through line 708, as will be described later.

(2) *Nitrogen cycle.*—Now will be described the nitrogen cycle in which hot nitrogen heats cold saline water in heat-exchanger H1, and cold nitrogen is heated by hot desalinated water in heat-exchanger H4.

Reservoir R2 is in the nitrogen cycle, it being recalled that this reservoir is closed and contains the cold saline water at a pressure of about 225 kg./cm.$^2$. The saline water settles at the bottom of the reservoir, and the top is filled with the nitrogen.

From reservoir R2, the nitrogen, at a temperature of about 22° C. and a pressure of 225 kg./cm.$^2$, passes through line 528 into hydraulic pressure-exchanger device A4–B4, illustrated in detail in FIG. 6. In the latter device its pressure is boosted to about 255 kg./cm.$^2$ and its temperature to about 32° C. It then passes through line 530 into the bottom of heat-exchanger H4.

In heat-exchanger H4, the nitrogen is heated to a temperature in the order of 260–360° C., depending upon the design, and exits from the heat-exchanger through line 532 at a pressure still about 255 kg./cm.$^2$. From line 532, the nitrogen then takes four different paths.

The first path of the nitrogen is through line 534 into pressure-exchanger A4–B4, where its high pressure of about 255 kg./cm.$^2$ is used to boost the pressure of the nitrogen coming through line 528 from about 255 kg./cm.$^2$ to about 255 kg./cm.$^2$, the latter exiting at line 530 and passing into heat-exchanger H4. The nitrogen from line 534, after passing through pressure-exchanger A4–B4, drops in pressure to about 225 and is then compressed to about 255.5 kg./cm.$^2$ (by compressor C8 in FIG. 6) and exits from the latter device through line 536. As indicated earlier, the structure of pressure-exchanger A2–B2 is the same as that of A4–B4 illustrated in FIG. 6.

The nitrogen from line 536 passes into line 538, which is a common line for the return of all the nitrogen from the above-mentioned four paths from heat-exchanger H4. This nitrogen is re-introduced into heat-exchanger H1 through line 538 for heating the saline water and exits from the heat-exchanger through line 540 into reservoir R2.

The second path of the nitrogen exiting from heat-exchanger H4 through line 532 includes line 542 directing the nitrogen into pressure-exchanger A3–B3, the structure of which is illustrated and described below in connection with FIG. 5. In this pressure-exchanger, the nitrogen at a pressure of about 255 kg./cm.$^2$ is used to boost the pressure of the desalinated water from about 245 kg./cm.$^2$ to about 255 kg./cm.$^2$, the latter exiting through line 522. The nitrogen exits from pressure-exchanger A3–B3 through line 544 at a pressure of about 245 kg./cm.$^2$.

The nitrogen then passes through turbine T1 and exits from that turbine through line 546 to common return line 538 at a pressure of about 225.5 kg./cm.$^2$. The drop of pressure of the nitrogen in turbine T1, from 245 kg./cm.$^2$ to 225.5 kg./cm.$^2$, produces a mechanical output in the turbine which may be used for driving the various pumps and compressors in the system. This will be more fully described below in connection with the description of the other turbines which are also driven by the expanding nitrogen to produce a mechanical output for driving the pumps and compressors.

The third path of the nitrogen from heat-exchanger H4 and line 532 includes line 548 where it is directed through turbine T2, exiting therefrom through line 550 and then into pressure-exchanger A2–B2. In turbine T2, the pressure of the nitrogen drops from 255 kg./cm.$^2$, to about 245.5 kg./cm.$^2$, this drop in pressure also being used by means of the turbine to produce a mechanical output for driving pumps and compressors. In the pressure-exchanger A2–B2 the work of the in-flowing nitrogen at a pressure of 245.5 kg./cm.$^2$ is used to boost the pressure of the water vapor from tank S1 (through line 514) as briefly described below, from 226 to 245 kg./cm.$^2$ and to drive out the same through line 516, heating coil F1 and line 518 into the bottom of heat exchanger 43. Pressure-exchanger A2–B2 is the same as A4–B4 illustrated in detail in FIG. 6.

From pressure-exchanger A2–B2, the nitrogen at a pressure of about 225.5 kg./cm.$^2$ then passes through conduit 552 into line 538, joining with the nitrogen from the other paths for introduction into heat-exchanger H1.

The fourth path of the nitrogen from heat-exchanger H4 through line 532 includes line 554 where it passes through turbine T3 exiting from the turbine through line 556 into common line 538. In turbine T3, the pressure of the nitrogen drops from about 255 kg./cm.$^2$ to 225.5 kg./cm.$^2$, this drop in pressure also being used to produce a mechanical output for driving the pumps and compressors.

This completes the description of the nitrogen cycle, except for a very minor cycle which will be described later.

With respect to the relative amount of nitrogen that may be diverted to each one of the above four paths, following is one example based upon a total quantity of nitrogen of 4,100 kg. per cubic meter of water produced, this being in volume about 32,500 litres under the conditions it exists when exiting from heat-exchanger H4: In the first-mentioned path, to compress the nitrogen in pressure-exchanger A4–B4, about 18,500 litres of nitrogen is used. In the second-mentioned path, to compress the desalinated water in pressure-exchanger A3–B3 and to drive turbine T1, about 1400 litres of nitrogen is used. In the third-mentioned path to drive turbine T2 and to compress the steam in pressure-exchanger A2–B2, about 11,200 litres of nitrogen is used. This leaves about 1,400 litres of nitrogen available for the fourth-mentioned path to drive turbine T3.

The output of these three turbines is available for doing mechanical work in the plant, for example, for driving the compressors, pumps, cyclic valves, etc. This is schematically indicated in FIG. 3 by the mechanical coupling 557 shown in broken dash-dot lines leading from the turbines to some (not all, for the sake of simplicity) pumps and compressors. Eventually the excess of mechanical work that may be obtained could be utilized for any purpose external to the system.

(3) *Paraffin cycle.*—Now will be described the paraffin cycle in which the paraffin heats the saline water in heat-exchanger H2 and is in turn heated by the desalinated water in heat-exchanger H3.

Starting with line 558 where the hot paraffin is introduced into heat-exchanger H2, the down-flowing paraffin in this heat-exchanger heats the saline water applied through line 510. The input temperature and pressure of the hot paraffin in line 558 are about 400–450° C., and 226 kg./cm.$^2$, respectively. The paraffin leaves heat-exchanger H2 through two lines, 560 and 562, the temperature of the paraffin in the latter being lower.

Heat-exchanger H2 is basically of the counter-current direct contact type as the other heat-exchangers but preferably includes the baffle arrangement to be described below.

It will be recalled that the saline water is introduced into heat-exchanger H2 through line 510 at a temperature which might be in the range of 280° C.–350° C. At the lower part of this temperature range, the saline water is heavier than the paraffin. Accordingly, at this part of the temperature range, both the saline water and the paraffin will flow in the same direction, i.e., downwardly, in direct heat-exchange contact.

In the case where the water is introduced at this lower part of the temperature range, an open-bottom concave-type annular baffle 564 is interposed, and there-below are also interposed an open-top, convex-type annular baffle 566, and an open-top concave-type annular baffle 567. The arrangement is such that the down-flowing saline water and the down-flowing paraffin will be in direct contact with each other as they pass through the inside of baffle 564, the outside of baffle 566, and the top (or outside) of baffle 567, the paraffin all the while heating the saline water. When both reach the top of baffle 567, the saline water is heated to a sufficient temperature where it is now lighter than the paraffin at the same region, and therefore the saline water will pass through the inside of baffle 566. Through its open top, and will continue upward through the heat-exchanger H2, all the while being further heated by the down-flowing paraffin.

Such a baffle arrangement makes it possible to use two cycles of paraffin for the whole process: one for the higher temperature range as described above; and the other for the temperature range between ordinary temperature and about 300°C.

As indicated earlier, the greatest portion of the phase separation occurs in heat-exchanger H2, and therefore this heat-exchanger will contain incoming saline water, water vapor, concentrated brine, paraffin, and crystallized calcium sulfates and carbonates. The densities of these substances are such that they settle and leave the heat-exchanger in the following manner:

The water vapor will rise to the top of the heat-exchanger and leave it through line 512, as described earlier.

The concentrated brine will rise to a level just above an outlet line 568, and will therefore be drawn out through that line. At this level in heat-exchanger H2, a settling tank S2 is provided together with a cover 569 thereover, to exhaust the brine and to shield the settling tank from the down-flowing paraffin. The brine leaving heat-exchanger H2 through line 568 flows into a further heat-exchanger H5 (not yet described) for separating all or almost all the water contained in the brine, for crystallizing the salt in the brine, and also for utilizing some of its heat to pre-heat the nitrogen. The water removed from the brine in heat-exchanger H5 is returned through line 570 into heat-exchanger H2 in the form of high-temperature steam, as will also be described below.

Heat-exchanger H2 also preferably includes a plurality of screens (not shown) at the top thereof and overlying settling tank S2 and its cover 569 and arranged in a criss-cross pattern, but spaced in between each. These screens, when used, would be in the path of the down-flowing paraffin and would therefore be coated by it. They would also be in the path of the up-flowing water vapor, and accordingly the latter would be continuously washed by the paraffin of any brine drops entrained with the vapor.

The paraffin removed from heat-exchanger H2 through line 560 is caught by a funnel 572 interposed at an intermediate point in the heat-exchanger. From line 560 the paraffin, at a pressure of about 226 kg./cm.$^2$, passes through a hydraulic pressure-exchanger A5–B5, the structure of which is illustrated in FIG. 4 and will be described below in detail. The paraffin leaves pressure-exchanger A5–B5 through line 574 at a pressure of about 245.5 kg./cm.$^2$ and is introduced into heat-exchanger H3 where it is heated by the up-flowing hot desalinated water vapor.

Paraffin leaves heat-exchanger H3 through funneled outlet line 576. Part of it passes back through pressure-exchanger A5–B5 where its pressure is dropped from 245 kg./cm.$^2$ back to about 226 kg./cm.$^2$, exits from the pressure-exchanger through line 578, passes through a heater coil F2 where its temperature is further raised, and then back into line 558 for introduction into the heat-exchanger H2.

The paraffin leaving heat-exchanger H2 through line 562 is withdrawn from the heat-exchanger at a lower level than that leaving the heat-exchanger through line 560, and therefore at a lower temperature. This paraffin is directed through pressure-exchanger A6–B6 (which is of the same construction as pressure-exchanger A5–B5) where its pressure is boosted from 226 kg./cm.$^2$ to about 245.5 kg./cm.$^2$. The paraffin leaves the latter pressure-exchanger through line 580 and is introduced into heat-exchanger H3 for heating by the up-flowing hot desalinated water vapor. This paraffin is also removed from the heat-exchanger through funneled outlet line 576 where it joins with the paraffin introduced through line 574. Part passes through line 581, pressure-exchanger A6–B6, line 582 to line 578, and the remainder passes through pressure-exchanger A5–B5 to line 578, and from there through heating coil F2 and line 558 for reintroduction into heat-exchanger H2.

There is a minor paraffin cycle which includes heat-exchanger H3 for heating the water vapor in tank S1. In this minor paraffin cycle, the paraffin is introduced into heat-exchanger H3 through inlet line 583 at a point below the funneled outlet line 576 of the earlier described paraffin cycle. It leaves the heat-exchanger H3 through line 584, and passes through a further pressure-exchanger device A7–B7, which is the same type of system as pressure-exchanger devices A5–B5 and A6–B6. In pressure-exchanger A7–B7 the paraffin pressure is dropped from 245 kg./cm.$^2$ at line 584 to about 226 kg./cm.$^2$ at the exit line 586 and is introduced into tank S1.

The heated water vapor from heat-exchanger H2 is introduced into the bottom of a horizontal or slightly inclined tank S1 through line 512, as discussed earlier. The paraffin from line 586 is introduced through a pipe 588 at the top of tank S1. Underlying pipe 588 is a screen 590 covered with pebbles 592 or other granular filling material. The paraffin flows downwardly through the tank and continuously coats the filling material 592 and screen 590, and as it does, it heats and washes the water vapor, rising upwardly, of any entrained salt crystals or separated from the entrained brine drops by this heating, or separated from the vapor by the rise of the temperature to 432° C. (or over) which is above the saturation temperature. Phase separation is completed in tank S1, the pure water vapor exiting from the tank through line 514, and the paraffin exiting from the tank through line 594. Exiting from line 594 would also be the crystallized salt particles. The latter may be removed through settling tank S3 in the following manner.

Periodically, settling tank S3 is connected to line 594 through the tank's line 596, as by a valve not shown, so that the settling tank S3 receives from tank S1 the paraffin containing a small quantity of crystallized salt. These substances settle in tank S3 at a level where the paraffin, floating on top, is above an exit line 598 of tank S3. The latter exit line is connected back to line 594. Additionally, settling tank S3 is periodically connected to line 594, the paraffin being returned back to line 594 through line 598, and the crystallized salts together with a little paraffin settling at the bottom of tank S3. The latter may be periodically removed through a bottom outlet 600, through line 568 into heat-exchanger H5.

To facilitate the settling and removal of the salt from heat-exchangers H1 and H2, similar settling tanks and by-pass connections may be provided in, e.g. lines 508 and 562. In addition, the settling tank E arrangement (FIG. 2) could also be used. Further, the bottoms of heat-exchangers H1 and H2 could be arranged as in $h1$ and $h2$ in FIG. 2.

The paraffin exiting from tank S1 through line 594 is at a pressure of about 226 kg./cm.$^2$. It is passed through pressure-exchanger A7–B7 where its pressure is boosted to about 245.5 kg./cm.$^2$, and then reintroduced through line 583 into heat-exchanger H3.

The input temperature of the hot water vapor in heat-exchanger H3 is about 460° C., as described earlier, and should normally be enough to heat the paraffin in the latter cycle to a point where it can heat the water vapor in tank S1 to a temperature of at least 432° C. (The saturation temperature of sodium chloride water solution is about 428° C.) If necessary, an additional relatively small heater may be included in the latter paraffin cycle for increasing the temperature of the paraffin sufficiently for this purpose.

Small quantities of paraffin accumulate in the pure water tank (R4) and in the salt and brine tank R5. These may be removed, and if necessary, washed (i.e. from tank R6), and then returned to the paraffin cycle.

(4) *Brine, crystallized salt and minor nitrogen cycles.*—As described earlier, the brine and crystallized salt are removed from heat-exchanger H2 through line 568, and salt crystals and a little paraffin are removed from tanks S1 and S3 through line 600. The latter joins with line 568, and both are connected to heat-exchanger H5 through an injector I1. In the latter injector, the brine is mixed with steam coming from line 602 and heated by heater F3 to a temperature of about 500° C., and is injected into heat-exchanger H5. Most of the water in the brine is vaporized and leaves the heat-exchanger H5 through line 604, where it is compressed by a small compressor C2 from a pressure of about 224 kg./cm.$^2$ to a pressure of about 226 kg./cm.$^2$. Part of this super-heated and compressed steam passes through line 570 for introduction into heat-exchanger H2, and another part is recirculated through line 602, heater F3, injector I1, and back into the heat-exchanger H5. The salt and a small portion of the brine containing mostly magnesium salt and a little paraffin from line 600 settle in heat-exchanger H5. The latter is filled with salt, brine and paraffin to about half its height, these being periodically removed, in portions, through bottom outlet line 606 into a salt brine and paraffin reservoir R5, where these may be conveniently separated.

The heat from the crystallized salt and brine introduced into heat-exchanger H5 is captured by a minor nitrogen cycle, wherein relatively cold nitrogen from line 528 is connected by line 608 and introduced through line 609 into the bottom of heat-exchanger H5. Another portion of the nitrogen is passed from line 538 into the heat-exchanger by means of line 610. The nitrogen is heated in heat-exchanger H5 and is removed therefrom through funneled outlet line 612 where it passes to a small compressor C3 for raising its pressure from about 224 kg./cm.$^2$ to about 225 kg./cm.$^2$, and is then introduced into heat-exchanger H1 through line 614.

In addition to the salt particles and heavily concentrated brine removed from heat-exchanger H5, there will also be some settling of salt particles of calcium carbonates and sulfates in both heat-exchangers H1 and H2. These may be periodically removed in a similar arrangement as described above with respect to tank S3, or E in FIG. 2.

(5) *Work output.*—It is seen that by compressing the pure water vapor in pressure-exchanger A2–B2, to boost its pressure before it is used to heat the paraffin in heat-exchanger H3, the "squeeze" problem is avoided as discussed earlier. By further compressing the pure water (now in liquid form) in pressure-exchanger A3–B3 to further boost its pressure, and correspondingly boosting the pressure of the nitrogen to be heated by the compressed water, an increase in the mechanical work output is made available (from turbines T1, T2 and T3) to drive the pumps, compressors, cyclic valves, etc. For example, assume the following with respect to the system of FIG. 2: The phase separation pressure is 226 kg./cm.$^2$ and the highest pressure of the system is 245 kg./cm.$^2$. These are the same as the first two pressures of FIG. 3, where there is a third pressure of 255 kg./cm.$^2$ for the heat exchange between the hot sweet water and the cold nitrogen in heat-exchanger H4. If in the system of FIG. 2, pressure-exchangers and turbines are used in the same manner as in FIG. 3, then the expanding nitrogen in FIG. 2 produces a mechanical output roughly corresponding to about that of turbine T3 plus 1½ times that of T1 of the present system. (The additional compression input requirement in the system of FIG. 3 is practically the input requirement for pressure exchanger A3–B3 which is half of T1 in the above.) This leaves a net additional output in the system of FIG. 3 comparable to the output of turbine T2 minus one-half that of T1, the latter being very small (less than 15%) of the output of T2.

Heater coils F1, F2 and F3 are used to add to the system the additional heat energy required. The share of the total heat added by any one may be varied according to the design of the overall system, it being seen that increasing the amount of heat added at one place will decrease the amount needed at the others. It will be further noted that this additional heat is added at the top of the heat ladder.

Thus, by this additional raising of the pressure of the pure water and of the nitrogen, the quantity of mechanical work output produced by the system is increased, the additional energy being supplied by heat with higher converting efficiency. This increase in the mechanical work output is available for driving the pumps, compressors, etc. and/or for external uses.

THE HYDRAULIC DEVICES OF FIGS. 4–7

The hydraulic devices and systems shown in FIGS. 4–7 are called "pressure-exchangers," as pressure is exchanged between two media, analogous to "heat-exchangers" where heat is exchanged between two media.

Before describing the S–D system for pumping salt water and recovering the nitrogen, included in the block in FIG. 3 and illustrated in FIG. 7, it will perhaps facilitate a better understanding of this system to describe first the hydraulic pressure-exchanger devices and systems illustrated in FIGS. 4, 5 and 6, since principles of the latter are included in the S–D system.

(1) *Hydraulic device of FIG. 4.*—The device illustrated in FIG. 4 is probably the simplest to explain, it being recalled that this structure is found in the devices A5–B5, A6–B6 and A7–B7 in FIG. 3. A description of A5–B5 will, therefore, suffice for understanding the other two.

It will also be recalled that hot paraffin at a pressure of about 245 kg./cm.$^2$ is introduced into pressure-exchanger A5–B5 through inlet line or conduit 576 and is removed therefrom at a pressure of about 226 kg./cm.$^2$ through outlet line or conduit 578. In addition, cooler paraffin at a pressure of about 226 kg./cm.$^2$ is introduced into the pressure-exchanger through line or conduit 560 and is removed therefrom at a pressure of about 245.5 kg./cm.$^2$ through outlet line or conduit 574.

Inlet conduit 576 is connected to a valve V1 so that its input may be applied either to chamber B5 through conduit 576' or to chamber A5 through conduit 576", depending upon the position of valve V1. Similarly, input conduit 560 is connected to a similar valve V2 arranged so that its input may be applied to chamber A5 through conduit 560" or to chamber B5 through conduit 560', according to the position of valve V2. Outlet conduit 578 is also connected through valve V1 to either chamber A5 or chamber B5, depending upon the position of the valve. Lastly, outlet conduit 574 is connected to either chambers B5 or A5, depending upon the position of valve V2. Small compressors C4 and C5 are included in outlet line 578 and 574 to maintain the flow of the fluids through the device and into the heat-exchangers.

Valves V1 and V2 are cyclically operable. That is, they are each operated so that for a time they are in the positions shown, and for another time they are reversed. When reversed, inlet conduit 576 is connected to conduit 576", outlet conduit 578 is connected to conduit 576', inlet conduit 560 is connected to conduit 560', and outlet conduit 574 is connected to conduit 560".

In use, both chambers A5 and B5 are filled with paraffin. The operation of pressure-exchanger A5–B5 of FIG. 4 is as follows:

When the cyclically operated valves V1 and V2 are in the position shown, inlet conduit 576 is connected to the top of chamber B5 and outlet conduit 578 is connected to the top of chamber A5. Similarly, inlet conduit 560 is connected to the bottom of chamber A5, and outlet conduit 574 is connected to the bottom of chamber B5. Accordingly, the 245 kg./cm.$^2$ pressure of the paraffin in inlet conduit 576 is applied to the paraffin at the bottom of chamber B5, this paraffin being the relatively cooler paraffin introduced previously through inlet conduit 560 at a pressure of about 226 kg./cm.$^2$. The paraffin at the bottom of chamber B5 will therefore be driven out of the chamber through conduit 560' and valve V2 at a pressure of about 245 kg./cm.$^2$. This pressure is boosted slightly to about 245.5 kg./cm.$^2$ in compressor C5, which is the pressure it leaves through conduit 574 for passing into heat-exchanger H3, as described earlier.

At the same time with the valve connections as shown, the relatively cooler paraffin passing through conduit 560 at a pressure of about 226 kg./cm.$^2$ is applied to the bottom of chamber A5. This drives out the paraffin at the top of chamber A5 through conduit 576" and valve V1 at the same pressure, i.e. 226 kg./cm.$^2$. The latter pressure is boosted slightly by compressor C4 to about 226.5 kg./cm.$^2$ for introduction into heat-exchanger H2 as described earlier.

Now when valves V1 and V2 are shifted in position during another portion of the cycle, they reverse the connections to chambers A5 and B5 as described earlier. The higher pressure paraffin is now applied from conduit 576 to the top of chamber A5 and forces the paraffin from the bottom of that chamber to output conduit 574, and similarly the lower pressure paraffin applied through input conduit 560 is applied to the bottom of chamber B5 and forces the paraffin from the top of that chamber through outlet conduit 578.

It is thus seen that a double-action pumping effect is produced as the valves V1 and V2 are cyclically shifted from one position to the other. In one portion of the cycle, the paraffin is forced out one end of each chamber and is introduced through the other end, and in the other portion of the cycle, the paraffin is forced out through the other end of each chamber and is introduced into the first end.

The volume of each chamber A5, B5 is larger than the total volume of paraffin flowing out (or in) through both cycle portions, so that a portion of the paraffin always remains within the chambers and acts as a separating layer between the two different temperature portions. The flow rate may be controlled by thermostatically-controlled circulating pumps (not shown) responsive to the temperature at e.g. the outlet conduits.

As an example, each of the chambers A5, B5 may be about five meters in length with an inner diameter of about 60 cm., and the timing for the cyclic valves V1 and V2 may be set for about 5 seconds in one position and about 5 seconds in the other position. For controlling valves V1 and V2, a crankshaft may be provided driven by any rotating motive means in the system, the crankshaft and its drive being schematically indicated by the reference numerals 618 and 619 in FIG. 4.

The foregoing description of the chamber dimensions, the timing for the cyclic valves, and the control thereof, could also apply to the corresponding elements in the hydraulic devices of FIGS. 5 and 6 described below.

(2) *Hydraulic device of FIG. 5.*—The pressure-exchange device illustrated in FIG. 5 is somewhat more complicated than that of FIG. 4. The FIG. 5 device is the structure of A3–B3 of FIG. 3 in which the desalinated water is introduced through line or conduit 520 at a pressure of about 245 kg./cm.$^2$ and is removed through line or conduit 522 at a pressure of about 255 kg./cm.$^2$. Also, nitrogen at a pressure of about 255 kg./cm.$^2$ is introduced through line 542 and is removed through line 544 at a pressure of about 245 kg./cm.$^2$.

The hydraulic device of FIG. 5 includes two chambers A3 and B3, and a pair of cyclically operable valves V3 and V4, similar to valves V1 and V2 described in FIG. 4. In the illustrated position of the valves, the nitrogen applied through inlet conduit 542 at a pressure of 255 kg./cm.$^2$ and boosted to about 255.5 kg./cm.$^2$ by compressor C6, is applied to the top of chamber A3, the outlet conduit 544 for the nitrogen being connected to the top of chamber B3. Also, the desalinated water applied through inlet conduit 520 at a pressure of about 245 kg./cm.$^2$ is introduced into the bottom of chamber B3, the outlet conduit 522 for the desalinated water being connected to the bottom of chamber A3. Thus, in this position of the valves, desalinated water will be driven out from the bottom of chamber A3 through outlet conduit 522 at a pressure of about 255.5 kg./cm.$^2$, and nitrogen will be driven out of the top of chamber B3 through outlet conduit 544 at a pressure of about 245 kg./cm.$^2$. The foregoing is apparent from the description of the earlier described embodiment in FIG. 4. Similarly, when valves V3 and V4 are operated in another portion of the cycle to change their connections, similar outputs are produced, but from the opposite chambers. In other words, this is the same type of double-action pumping effect described with respect to FIG. 4.

However, the device in FIG. 5 includes chamber valve means in both chambers A3 and B3 for closing these chambers to the two fluids at the appropriate times, to assure that one fluid (for example, the nitrogen in line 542) will not flow through the outlet for the other fluid, and vice versa. These chamber valves are not necessary in the FIG. 4 embodiment since the two fluids are of the same material (paraffin), but at different temperatures, and therefore some mixing will not be detrimental.

The four chamber valves in the two chambers A3 and B3 are generally designated $v1$, $v2$, $v3$, and $v4$. They are all float operated so that they close in response to a change in the level of a fluid, each valve being normally maintained in an open position by a spring.

Considering valve $v1$ for example, it is seen that it includes a receptacle 620 filled with one of the fluids in the chamber, which could be either the desalinated water or nitrogen, but preferably nitrogen. The receptacle is formed with an opening 622 at the top thereof so that its interior is subject to the same pressure as the interior of chamber A3. The valve is supported by a stem 624 passing through an opening in the top of chamber A3, the stem including a stop 626 resting on top of the chamber so as to limit the open position of the valve. The upper end of the stem 624 is treaded and includes a nut 628. A coil spring 630 is interposed between nut 628 and the upper end of the chamber, and is of sufficient force to support the weight of receptacle 620 when filled with its fluid (e.g. nitrogen) so that the receptacle will float on the pure water when the latter rises from the other end of the chamber A3. It will thus rise until it closes the opening in the upper part of chamber A3 to interrupt the further rising of the water and, thereby, to prevent the further out-flow of nitrogen and then the out-flow of the water. As soon as the water level drops in the next portion of the cycle, the receptacle 620 drops with it and the valve opens. Nut 628 adjusts the force of the spring 630.

In operation, assuming cyclic valves V3 and V4 are in the positions illustrated in FIG. 5, the nitrogen from line 542 will flow into the top of chamber A3 and will force out the water through the bottom opening in the chamber A3 and through outlet 522. When the water in chamber A3 drops to its low point, the receptacle (620) for valve $v2$ will begin to float in the falling-level water until it closes the bottom opening in chamber A3, terminating any further outflow of water. Similarly, the water flowing through inlet conduit 520 will be directed into the bottom of chamber B3 and will force out the nitrogen in the top of the chamber through outlet conduit 544, until the water level rises to the high point in chamber B3 where receptacle 620 for valve $v3$ floats on it and closes the top opening in that chamber.

It is thus seen that the inlet pressure of the nitrogen in conduit 542 is applied to drive the water through outlet conduit 522 at the same pressure, and the inlet pressure of the water in line 520 is applied to drive out the nitrogen through line 544.

In the next portion of the cycle, cyclic valves V3 and V4 reverse their connections, producing the same results but in the reversed chambers.

By including these float-operated valves in chambers A3 and B3, it is seen that the chambers are closed whenever the level of the fluid from the oppposite side of the chamber rises or lowers to a level approaching the outlet end of that chamber, this closing of the valve assuring that that fluid will not flow into the wrong outlet conduit.

(3) *Hydraulic device of FIG. 6.*—The hydraulic pressure-exchanger illustrated in FIG. 6 represents the construction of both the A2–B2 and A4–B4 devices of FIG. 3. For the purpose of explaining the arrangement and operation of these devices, that of A4–B4 is particularly illustrated in FIG. 6, it being understood that the device of A2–B2 is the same but working with different fluids and somewhat different pressures.

It will be recalled that the pressure-exchanger A4–B4 passes relatively hot nitrogen at a pressure of about 255 kg./cm.$^2$ from input line or conduit 534 which is translated to an output pressure of 225.5 kg./cm.$^2$ at output line or conduit 536; and passes relatively cold nitrogen at a pressure of 225 kg./cm.$^2$ from input line or conduit 528 which is translated to an output pressure of 255.5 kg./cm.$^2$ at output line or conduit 530.

The pressure-exchanger of FIG. 6 includes two chambers each made up of two chamber sections. One chamber comprises chamber sections A4 and A'4 inter-connected at the bottom by connection 650, and the other chamber is made up of chamber sections B4 and B'4 interconnected by bottom connection 652. Paraffin is included in the bottoms of all the chamber sections, including interconnections 650 and 652, the remaining volumes of the chamber sections being adapted to contain the nitrogen applied from inlet conduits 524 and 528. Each of the chamber sections further includes, at the upper end, a floating valve member $v5$, $v6$, $v7$ and $v8$, each similar to floating valve $v1$ in FIG. 5. That is, with respect to valve $v5$, it includes a receptacle 654 normally filled with nitrogen and opened at the top at 656 so that it communicates with the chamber, a stem 658, a coil-spring 660, an adjustable nut 662, and a stop 664 limiting the open position of the valve member. The valve is normally supported in the open position by spring 660 such that it floats in the paraffin, when the paraffin rises, to close the top of the chamber section.

A small compressor C7 is included in inlet conduit 534 sufficient only to maintain the flow of the hot nitrogen through the device, and another small compressor C8 is included in outlet conduit 536, being sufficient to raise the pressure of the hot nitrogen flowing through its respective conduit about 0.5 kg./cm.$^2$ so that it is at a pressure of about 225.5 kg./cm.$^2$ at outlet conduit 536.

Further the device in FIG. 6 includes a cyclically operable valve V5, similar to the corresponding valves V1, V2, V3 and V4 in FIGS. 4 and 5. For a part of the cycle, valve V5 is in the position illustrated, where it connects inlets conduit 534 to chamber section B4 and outlet conduit 536 to chamber section A'4; and for another part of the cycle it is in the section position where it connects inlet conduit 534 to chamber section A'4 and outlet conduit 536 to chamber B4.

The device further includes four one-way ball valves, namely: valve 670, which is in the line between conduit 528 and chamber section B'4; valve 672, which is in the line between conduit 530 and chamber section B'4; valve 674, which is in the line between conduit 528 and chamber section A4; and valve 676, which is in the line between conduit 530 and chamber section A4.

The operation of the device is as follows, assuming valve V5 is in the position illustrated.

The relatively hot nitrogen at a pressure of 255 kg./cm.$^2$ is applied through inlet conduit 534, compressor C7 (to drive the compressed nitrogen through the device), and then through valve V5 into chamber section B4. Chamber section B'4 was filled with the relatively cold nitrogen applied from inlet 528 at a pressure of 225 kg./cm.$^2$ during the previous cycle. Thus, the 255 kg./cm.$^2$ pressure at inlet 534 (plus the small additional pressure from C7) is applied to the paraffin in chamber section B4, the latter rising in chamber section B'4 and forcing the cold nitrogen out past one-way valve 672 into outlet 530 at a pressure of 255 kg./cm.$^2$. The latter pressure is also applied to one-way valve 670, which closes and thereby prevents the nitrogen in line 528 from entering chamber section B'4 at this time; and to one-way valve 676, which also closes and prevents the cold nitrogen from line 528 flowing out through line 530.

At the same part of the cycle, the relatively cold nitrogen from inlet conduit 528 passes through one-way valve 674 into the top of chamber section A4, this pressure being transmitted through the paraffin and driving out the relatively hot nitrogen (previously applied) from chamber section A'4 at the pressure of 225 kg./cm.$^2$. The latter nitrogen passes through valve V5 and is compressed by compressor C8 to boost its pressure to 225.5 kg./cm.² at outlet conduit 536.

When the paraffin in chamber sections B'4 and A'4 rise to their high points, their floater valves v8 and v6 respectively, close in the manner described previously.

Cyclic valve V5 will be actuated later in the cycle to reverse its connections so that the hot nitrogen at the higher pressure from inlet conduit 534 is applied to chamber section A'4, and the outlet conduit 536 is connected to chamber section B4. When this occurs, the higher pressure from line 534 drives the paraffin down in chamber section A'4, and forces the relatively cold nitrogen out of the top of chamber section A4, opening one-way valve 676, and passing the nitrogen into outlet conduit 530 at a pressure of 255 kg./cm.². Valve 672 closes, and the relatively cold nitrogen at the lower pressure from inlet conduit 528 is now permitted to pass through one-way valve 670 into the top of chamber section B'4 where its pressure is transmitted through the paraffin to the hot nitrogen at the top of chamber section B4 and forces the latter out through valve V5, compressor C8, and outlet conduit 536.

It is thus seen that this arrangement is similar to that in FIG. 5, in that it provides the same type of double-action pressure-exchange, between the higher and lower pressure fluids. However, since in this case the fluids are both gases (nitrogen, at different temperatures) an intermediate separating medium is needed, this medium being the paraffin between the two chamber sections.

As in the previously described devices, valves v5, v6, v7 and v8 are normally in their open positions, but will float in the paraffin as the latter rises so as to close their respective chamber sections before the paraffin rises to the level where it may flow out through the chamber section. As soon as the paraffin level drops in a chamber section, its respective floater valve reopens.

(4) *Hydraulic device of FIG. 7.*—Having described the pressure-exchanging devices of FIGS. 4, 5 and 6, we can now proceed with the description of the relatively more complicated S–D system and the other elements illustrated in FIG. 7. As will be recalled from the description of FIG. 3, this system is used, among other functions, to draw saline water SW from reservoir R1 at atmospheric pressure into closed reservoir R2 pressurized at about 225 kg./cm.². The pressure of the produced desalinated water is utilized for this purpose. The system is also used to recover the nitrogen dissolved in the compressed outflowing pure water.

The saline water passes from line 502 past a one-way valve 680 to a conduit 681. Connected to the latter conduit is a chamber S having an opening at the bottom closed by a floater valve v9, similar to floater valves v2 and v4 in the FIG. 5 device. Chamber S is connected by conduit 682 to a closed tank 684. Its upper end is connected by connection 686 to another chamber D having a floater valve v10 closing an opening at the top of the chamber. The bottom of chamber S is adapted to receive saline water from reservoir R1, and the bottom of chamber D is adapted to receive desalinated or pure water through line 688 from reservoir R3 where it is at a pressure of 255 kg./cm.², as described earlier. About one third of the volume of the two chambers S and D is occupied with paraffin which, being lighter than the saline and the desalinated water at these temperatures, floats on top. The interconnection 686 always contains paraffin.

The S–D system further includes three cyclically operable valves V6, V7 and V8. Valve V6 is in line 688 between pressurized reservoir R3 for the desalinated water and the bottom of chamber D; valve V7 is in the line 689 between the bottom of chamber D and a relatively small tank 690; and valve V8 is in line 692 leading from tank 690 to an injector 12. Tank 690 is connected to a larger tank 694 through line 691, which in turn is connected through one-way valve 696 to a line 698 emptying into pure water reservoir R4.

A further tank 700 is provided connected to injector I2, this tank being maintained under a vacuum of about 0.5 kg./cm.² by a continuously running compressor C9, the output of which is connected to line 608 in the nitrogen cycle described earlier.

Further, there is a connection 702 between line 692 and the top of chamber D, at the exit side of the floater valve v10.

Valves V6, V7 and V8 are cyclically operable to open and close. They do not operate at the same time however. As one example, valve V6 may be opened from 0–60° and closed from 60–360° of the cycle; valve v7 may be closed 0–60°, opened from 60–180°, and closed from 180–360°; and valve V8 may be closed from 0–180° and opened from 180–360°. In one application, a complete cycle for these valves would be about ½ minute, and chambers S and D would be about 5 meters in length and 60 cm. in diameter, this system being capable to compress and drive into the plant about 4000 m.³ of saline water per hour. This capacity can be increased, as desired, by increasing the capacities of S and D, and/or by multiplying the S–D system.

The operation of the system of FIG. 7 is as follows:

Starting at the 0° point in the cycle, valve V6 is open and therefore the 255 kg./cm.² pressure of the pure water in reservoir R3 is applied to the bottom of chamber D filled with paraffin. This forces the desalinated water up in chamber D and the paraffin down in chamber S, and thereby forces saline water (which had been previously introduced into the latter chamber) through line 682, past one-way valve 704 and into line 504 where it is transmitted to reservoir R2 pressurized at 225 kg./cm.² (FIG. 3). When the paraffin in chamber S drops to the low level, it closes floater valve V9. Floater valve V10 in chamber D is closed in this operation when the paraffin in that chamber is at its high point.

At the 60° point in the cycle, valve V6 closes and valve V7 opens to connect the lower end of chamber D to atmospheric pressure through tank 690, tank 694, line 698 and tank R4. The pure water in chamber D contains a substantial amount of dissolved nitrogen, about 4½ kg. per cubic meter of water under the conditions in R3 and in chamber D. The sudden release of pressure in chamber D, caused by the opening of valve V7 connecting it to atmospheric pressure, permits the nitrogen dissolved in the pure water to expand. The expansion of this nitrogen from 255 to about 3.5 kg./cm.² forces the pure water out of chamber D, valve V7, through tank 690, and into tank 694. The volume of the latter tank should be a little greater than the volume of chamber D occupied by the pure water. A little space at the top of tank 694 will be occupied by nitrogen.

This filling of tank 694 under the pressure of the expanding nitrogen forces the water previously there, to pass by valve 696, through line 698, and into pure water reservoir R4. By this expansion, the expelled water from D could drive the water in tank 694 to a height of about 200 meters, or be used to produce motive power by a water turbine.

The purpose of smaller tank 690 is to terminate the flow of the pure water from chamber D when it reaches the minimum level in that chamber. The pure water will cease to flow from chamber D when it reaches a level in that chamber corresponding to the location of the outlet from tank 690, because the pressure of the nitrogen on the water surface in chamber D and tank 690 is the same.

As the pure water leaves chamber D, floater valve v10 opens, thereby connecting line 702 to the interior of chamber D. The significance of this appears below.

At the 180° point in the cycle, valve V8 opens and valve V7 closes. Opening valve V8 connects line 692, and also line 702, to injector I2, permitting the nitrogen to pass out through the injector. The nitrogen thus exhausted comes from the interior of chamber D, line 702, line 692, tank 690, and tank 694. This nitrogen is re-pumped by compressor C9 back into pressurized reservoir R2 through line 608 for recirculation in the system.

Tank 700 communicates with injector 12 and is maintained under a continuous vacuum by compressor C9 so that when the initial super-atmospheric pressure (about 3.5 atmospheres) of the nitrogen passing through the injector falls below the atmospheric pressure, tank 700 maintains a continuous vacuum drawing out the nitrogen from the system.

The purpose of tank 684, communicating with line 682 and chamber S, is to assure opening of floater valve v9 in chamber S to allow the saline water to float into S after opening valve V8 and producing vacuum in chamber S. Tank 684 is almost completely filled with saline water, but includes a little nitrogen (or other gas) at the top of the chamber. When a part of the pure water in chamber D flows out, the pressure exerted by the compressed nitrogen at the top of tank 684 is sufficient to pass enough saline water from the tank 684 into chamber S to open floater valve v9. Chamber S then draws saline water therein through line 502 when valve V7 closes and after V8 opens. Thus, when the next cycle is to start, chamber S is full of saline water. Valve 705 is a regulating valve which closes and terminates the outflow of water from tank 684 after a small expansion of the nitrogen, about 5-10 atmospheres, sufficient only to pass enough saline water into chamber S to open valve v9.

Reservoir R4 includes, beside outlet 526 for removing the substantially pure desalinated water when and as required, a further outlet 708 through which some of the pure water is pumped by pump C10 back to pressurized reservoir R3. The purpose of the latter arrangement is to compensate for volume losses in the system and in the hydraulic pressure-exchangers. In a typical system, it is contemplated that for every 1050 liters of saline water drawn into the system from reservoir R4, about 100 liters of pure water would have to be pumped back through line 708 to reservoir R3. With an input of 1050 liters of saline water, the system produces an output of about 1000 liters of pure desalinated water.

SUMMARY OF ADVANTAGES

The following summarizes some of the main advantages available by using various features of the invention as described above:

(1) *Energy input.*—Most of the energy input in heating the saline water to the vicinity of the critical temperature and effecting the separation is regained by the new incoming saline water from the separated hot desalinated water vapor and hot saline brine. This is made possible by the various features described, and particularly by the feature that the heating and cooling temperature lines are ascending and descending respectively, rather than being substantially horizontal, as discussed above with respect to FIG. 1 and particularly as discussed with respect to the distinctions of the present process over the known vapor-compression method. At the same time, the "squeeze" problem is also avoided.

Moreover, because of the wide range of temperatures and pressures involved in the process, the process enables the production of mechanical work to drive all the mechanical devices, and even to produce an excess available for use external to the system. Therefore, systems may be designed in accordance with the invention in which the only kind of energy used is heat energy, e.g. burning fuel.

It is believed, on the basis of calculations that systems in accordance with the invention are attainable requiring only about 2½ kg. of fuel for the production of 1 cubic meter of water.

(2) *Scale and corrosion.*—The invention permits the substantial decrease in the equipment coming into contact with corrosive water. This is accomplished primarily by the use of the intermediary fluids in direct-contact, heat-exchange relationship with the various media being heated and cooled, and also by the use of the hydraulic devices described for exchanging pressures between the various fluids and for pumping fluids through the system. Thus, the amortization and maintenance costs of the systems are reduced to a small fraction compared to systems affected by formation of corrosion and scale.

(3) *Mechanical driving equipment.*—Primarily, because of the wide range of temperatures involved in the process and the use of intermediary fluids which go through thermodynamic cycles involving wide ranges of pressures and temperatures, and also because of the use of the hydraulic-pressure exchangers described, the requirement for very expensive mechanical equipment for motive power generating, driving, pumping, compressing, etc., the various fluids in the system is substantially reduced, thereby permitting a substantial reduction in the plant investment as well as in the amortization and maintenance costs.

(4) *Salinity of produced water.*—It appears from the available data, e.g. as given in the table referred to in the description, that water produced in accordance with the FIG. 3 embodiment will contain about 100 p.p.m. of the chloride ion. It also appears from this data that the salt content could be further reduced if desired by an increase in the temperature of separation. Such low-salinity water is excellent for drinking and irrigation purposes.

(5) *Compact equipment.*—In most distillation processes heretofore proposed the volume of vapor handled in order to produce 1 cubic meter of water is approximately 1700 cubic meters. In the direct freezing process many times that (about 50,000 cubic meters of vapor) are handled. In contrast to these processes, the present invention, because it operates at high pressures, requires the handling of a small fraction of these volumes, about 10 cubic meters of water vapor per cubic meter of produced water and in total about 70 cubic meters of all the fluids in the system. Thus, comparatively small and compact equipment could produce large amounts of pure water.

(6) *Expandability of equipment.*—The system can be constructed so that it includes mostly a line of heat-exchangers and a line of hydraulic pressure-exchangers. These can be easily arranged in pairs, in groups of three, or more, and therefore the capacity of a system can be multiplied without fully duplicating all the equipment. Furthermore the capacity can be increased by increasing the diameters of the heat-exchanger and pressure-exchanger cylinders, the volume varying as the square of the diameter.

(7) *Recovery of salts.*—The invention permits a very high percentage of sweet water to be extracted from the saline water, resulting in a very highly concentrated brine at the outlet end of the system. The salt constituents may be conveniently extracted from the brine, as described, and moreover they may be separated from each other. For example, one of the heat-exchangers could be operated at about 350° C. where practically all the calcium salts precipitate and may be separated. Alternatively a first phase separation could be effected at a temperature before sodium chloride begins to precipitate (400° C. for instance) so that only calcium carbonates and sulfates precipitate and are separated from the saline water and/or the paraffin in the manner described. The concentrated brine appearing at the outlet end may be vaporized with hot steam (as described above) until crystalline sodium chloride is obtained in a brine of magnesium chloride. The two can then be separated by filtering and washing, or by any other known method.

(8) *Resulting pure water at high energy level.*—Since the pure water leaves the heat-exchangers at a high pressure and with amounts of nitrogen dissolved therein, as described above, lowering the pressure of the pure water at the outlet end of the system permits the nitrogen to expand, which expansion can be used to do work or preferably to drive the water directly to the water supply system at the required elevation, without any other mechanical driving equipment.

It is to be understood that the values and examples set forth are given merely to illustrate the principles of the invention and are not necessarily exact or required to utilize successfully the various features of the invention described. Also, it will be appreciated that the various features can be used separately, and particularly that the system of FIG. 3 need not use the hydraulic devices of FIGS. 4–7, and that the latter devices may be used in other systems.

It is therefore to be clearly understood that the described embodiments of the invention are illustrative only, and that many other embodiments, variations and applications of the invention, or the several features thereof disclosed, may be made without departing from the spirit or scope of the invention as defined in the following claims.

I claim:

1. In a process for the demineralization of saline water, the steps comprising effecting phase separation in the vicinity of the critical pressure of substantially pure water to produce a substantially pure water vapor fraction and a salt-rich fraction of different densities; after the phase separation, adiabatically compressing the substantially pure water vapor fraction to above the critical pressure of pure water; and utilizing the heat of said compressed substantially pure water fraction to heat additional saline water to be demineralized.

2. In a process for the demineralization of saline water, the steps comprising effecting the phase separation at approximately the critical pressure of pure water to produce a substantially pure water vapor fraction and a salt-rich fraction; after the phase separation, additionally compressing the substantially pure water vapor fraction to raise its pressure 5–50 kg./cm.$^2$; and utilizing the heat of said compressed substantially pure water fraction to heat additional saline water to be demineralized.

3. In a process for the phase-separation of a solvent from a liquid solution involving a large temperature differential between a relatively cold incoming liquid solution and a relatively hot separated solvent-rich fraction, the improvement comprising the steps of passing a gas into direct counter-current contact with said relatively cold liquid solution to heat said solution and to cool said gas; compressing said gas; passing said gas into direct counter-current contact with said relatively hot separated solvent-rich fraction to heat said gas and to cool said fraction; expanding said gas; and converting the energy generated by the expansion of said gas, being substantially greater than the energy expended in its compression, to perform mechanical work.

4. The process as defined in claim 3, wherein said gas is nitrogen.

5. In a process for the phase-separation of a solvent from a liquid solution, the steps comprising heating the liquid solution to the phase-separation temperature at a first pressure by passing the liquid solution in heat-exchange relationship with a first fluid in the form of a gas and then with a second fluid, producing a hot solvent-rich fraction at said first pressure; raising the pressure of said hot solvent-rich fraction to a second pressure; passing said solvent-rich fraction in heat-exchange relationship with said second fluid to heat the fluid and to cool said fraction; further raising the pressure of said solvent-rich fraction to a third pressure; raising the pressure of said cooled gas to said third pressure; passing said solvent-rich fraction in the liquid state in heat-exchange relationship with said cooled gas to further cool said solvent-rich fraction and ot heat said gas; lowering the pressure of said gas; passing said gas in heat-exchange relationship with incoming cold liquid solution; and converting the excess of work generated by the lowering of the pressure of said gas when hot over that expended in raising the pressure of said gas when cold to perform mechanical work.

6. Apparatus for the phase separation of a solvent from a liquid solution comprising means for raising the pressure of the liquid solution to the vicinity of the critical pressure of the solvent; means for heating said liquid solution at said pressure to effect phase separation thereof producing a solvent-rich vapor fraction and a solute-rich fraction; means for separating said two fractions; means for additionally compressing the solvent-rich vapor fraction to raise its specific heat and temperature; and means for utilizing heat of said compressed solvent-rich fraction to heat additional liquid solution to be processed.

7. Apparatus as defined in claim 6, wherein said means for separating the two fractions includes a vapor washing arrangement comprising a tank, a screen supporting a layer of graular material disposed within said tank, means for introducing said solvent-rich vapor fraction into said tank below said screen and removing same at a point above said screen; and means for introducing a liquid into said tank at a point above said screen and removing same at a point below said screen.

8. Apparatus for the phase-separation of a solvent from a liquid solution, comprising means including at least one intermediary fluid for raising the pressure of said liquid solution to the vicinity of the critical pressure of the solvent; means for heating said liquid solution to effect phase separation to produce a solvent-rich vapor fraction and a solute-rich fraction; means for separating said fractions; means for additionally compressing the solvent-rich vapor fraction to raise its specific heat and temperature; and means including said intermediary fluid for utilizing the heat of said compressed solvent-rich fraction and solute-rich fraction to heat additional liquid solution to be processed; at least one of said compressing means including a hydraulic device exchanging the pressure of one fluid in the system with that of another, said hydraulic device comprising an inlet conduit for one fluid at a certain pressure; an outlet conduit for said one fluid; an inlet conduit for another fluid at a different pressure; an outlet conduit for said other fluid; a chamber; cyclically operable valve means connecting during one portion of the cycle said one fluid inlet conduit to said chamber and said other fluid outlet conduit to said chamber, whereby during said portion of the cycle the inlet pressure of said one fluid is applied to said other fluid in said chamber to drive said other fluid out of said chamber through said other fluid outlet conduit at the same or lower pressure as that at said one fluid inlet conduit; said other fluid being permitted to flow through said other fluid inlet conduit to said chamber during another portion of said cycle.

References Cited

UNITED STATES PATENTS

| | | | |
|---|---|---|---|
| 1,204,716 | 11/1916 | Thorssell | 203—24 |
| 2,520,186 | 8/1950 | Von Platen | 203—11 |
| 2,976,224 | 3/1961 | Gilliland | 203—10 |
| 2,764,488 | 9/1956 | Slattery | 62—123 |
| 2,821,304 | 1/1958 | Zarchin | 62—123 |
| 3,213,001 | 10/1965 | Schmidt | 202—173 |
| 3,243,359 | 3/1966 | Schmidt | 202—174 |

OTHER REFERENCES

Saline Water Conversion Symposium (1958), pp. 80–89 incl., entitled "Critical Pressure Distillation," by Anthony and Berkowitz.

NORMAN YUDKOFF, Primary Examiner

F. E. DRUMMOND, Assistant Examiner

U.S. Cl. X.R.

23—295; 203—24; 202—173